United States Patent
Euzen et al.

(10) Patent No.: US 7,655,136 B2
(45) Date of Patent: Feb. 2, 2010

(54) PROCESS FOR PRODUCING MIDDLE DISTILLATES BY HYDROISOMERIZING AND HYDROCRACKING FEEDS FROM THE FISCHER-TROPSCH PROCESS USING A DOPED CATALYST BASED ON MESOPOROUS ALUMINA-SILICA WITH A CONTROLLED MACROPORE CONTENT

(75) Inventors: Patrick Euzen, Paris (FR); Christophe Gueret, St Romain en Gal (FR); Vincenzo Calemma, Milan (IT)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 308 days.

(21) Appl. No.: 11/475,259

(22) Filed: Jun. 27, 2006

(65) Prior Publication Data

US 2007/0056879 A1  Mar. 15, 2007

(30) Foreign Application Priority Data

Jun. 28, 2005  (FR)  ................................... 05 06590

(51) Int. Cl.
*C10G 11/02* (2006.01)

(52) U.S. Cl. .................... 208/114; 208/118; 208/120.3; 208/120.35; 208/59

(58) Field of Classification Search ....................... None
See application file for complete search history.

(56) References Cited

U.S. PATENT DOCUMENTS

| | | | |
|---|---|---|---|
| 3,271,299 A * | 9/1966 | Kearby ....................... | 208/114 |
| 4,879,265 A * | 11/1989 | Simpson et al. ............. | 502/211 |
| 5,370,788 A | 12/1994 | Dai et al. | |
| 6,860,987 B2 * | 3/2005 | Plantenga et al. ........... | 208/217 |
| 7,220,349 B2 * | 5/2007 | Benazzi et al. ................ | 208/58 |
| 7,404,890 B2 * | 7/2008 | Benazzi et al. .............. | 208/108 |
| 2003/0057134 A1 | 3/2003 | Benazzi et al. | |
| 2006/0011512 A1 * | 1/2006 | Espinoza et al. ......... | 208/111.3 |
| 2006/0144755 A1 | 7/2006 | Benazzi et al. | |

FOREIGN PATENT DOCUMENTS

| | | |
|---|---|---|
| EP | 0297949 A1 | 1/1989 |
| FR | 2850393 A1 | 7/2004 |

* cited by examiner

*Primary Examiner*—Tam M Nguyen
(74) *Attorney, Agent, or Firm*—Millen, White, Zelano & Branigan, P.C.

(57) ABSTRACT

The invention concerns a process for producing middle distillates from a paraffinic feed produced by Fischer-Tropsch synthesis, using a hydrocracking/hydroisomerization catalyst which comprises:
  at least one hydrodehydrogenating element selected from the group formed by elements from group VIB and group VIII of the periodic table;
  0.01% to 6% of phosphorus as a doping element;
  and a non-zeolitic support based on mesoporous alumina-silica.

21 Claims, 5 Drawing Sheets

PROCESS FOR PRODUCING MIDDLE DISTILLATES BY HYDROISOMERIZING AND HYDROCRACKING FEEDS FROM THE FISCHER-TROPSCH PROCESS USING A DOPED CATALYST BASED ON MESOPOROUS ALUMINA-SILICA WITH A CONTROLLED MACROPORE CONTENT

The present invention relates to a process for a hydrocracking and hydroisomerization treatment of feeds from the Fischer-Tropsch process, to produce middle distillates (gas oil, kerosene) employing a doped catalyst comprising a particular silica-alumina.

In the Fischer-Tropsch process, synthesis gas ($CO+H_2$) is catalytically transformed into oxygen-containing products and essentially straight-chain hydrocarbons in the gas, liquid or solid form. Such products are generally free of heteroatomic impurities examples of which are sulphur, nitrogen or metals. They also contain practically no or only a few aromatics, naphthenes and more generally cycles, in particular in the case of cobalt catalysts. In contrast, they may have a non negligible amount of oxygen-containing products which, expressed as the weight of oxygen, is generally less than about 5% by weight, and also an amount of unsaturated compounds (generally olefinic products) which is generally less than 10% by weight. However, such products, principally constituted by normal paraffins, cannot be used as they are, in particular because of their cold properties which are not compatible with the usual use of oil cuts. As an example, the pour point of a straight-chain hydrocarbon containing 20 carbon atoms per molecule (boiling point of about 340° C., i.e. usually in the middle distillates cut range) is about +37° C., rendering its use impossible, as the specification is −15° C. for gas oil. Hydrocarbons from the Fischer-Tropsch process comprising mainly n-paraffins have to be transformed into products which are more upgradeable, such as gas oil, or kerosene which are, for example, obtained after catalytic hydroisomerization reactions.

European patent EP-A-0 583 836 describes a process for producing middle distillates from a feed obtained by the Fischer-Tropsch process. In this process, the feed is treated as a whole, and in addition the C4− fraction can be removed to obtain a C5+ fraction boiling at almost 100° C. Said feed undergoes hydrotreatment then hydroisomerization with a conversion (of products boiling above 370° C. into products with a lower boiling point) of at least 40% by weight. A catalyst for use in hydroconversion has a "platinum on silica-alumina" formulation. The conversions described in the examples are at most 60% by weight.

EP-A-0 321 303 also describes a process for treating said feeds to produce middle distillates and possibly oils. In one implementation, middle distillates are obtained by a process consisting of treating the heavy fraction of the feed, i.e. with an initial boiling point in the range 232° C. to 343° C., by hydroisomerization on a fluorinated catalyst containing a metal from group VIII and alumina and having particular physico-chemical characteristics. After hydroisomerization, the effluent is distilled and the heavy portion is recycled to the hydroisomerization step. The hydroisomerization conversion of 370° C.+ products is given as being in the range 50-95% by weight and the examples give 85-87%.

All of the catalysts in current use in hydroisomerization are bifunctional in type, associating an acid function with a hydrogenating function. The acid function is supplied by supports with large surface areas (generally of 150 to 800 m$^2$/g) and with a superficial acidity, such as halogenated aluminas (chlorinated or fluorinated), phosphorus-containing aluminas, combinations of oxides of boron and aluminium, amorphous alumina-silicas and silica-aluminas. The hydrogenating function is supplied either by one or more metals from group VIII of the periodic table such as iron, cobalt, nickel, ruthenium, rhodium, palladium, osmium, iridium or platinum, or by a combination of at least one metal from group VI such as chromium, molybdenum or tungsten, and at least one group VIII metal.

The balance between the two functions, acid and hydrogenating, is one parameter which governs the activity and selectivity of the catalyst. A weak acid function and a strong hydrogenating function produces less active catalysts which are also less selective as regards isomerization, while a strong acid function and a weak hydrogenating function products catalysts which are highly active and selective as regards cracking. A third possibility is to use a strong acid function and a strong hydrogenating function to obtain a catalyst which is highly active but also highly selective as regards isomerization. Thus, by carefully selecting each of the functions, it is possible to adjust the activity/selectivity balance of the catalyst.

Thus, the present invention concerns a process for producing middle distillates. This process can:
  greatly improve the cold properties of paraffins from the Fischer-Tropsch process and produce boiling points which correspond to those of gas oil and kerosene fractions (also termed middle distillates) and in particular, can improve the freezing point of kerosenes;
  improve the quantity of middle distillates available by hydrocracking the heaviest paraffinic compounds present in the effluent from the Fischer-Tropsch unit, and which have boiling points which are higher than those from kerosene and gas oil cuts, for example the 380° C.+ fraction.

This process employs a particular silica-alumina which can produce highly selective and active catalysts.

More precisely, the invention concerns a process for producing middle distillates from a paraffinic feed produced by Fischer-Tropsch synthesis employing a particular hydrocracking/hydroisomerization catalyst comprising:
  at least one hydrodehydrogenating element selected from the group formed by elements from group VIB and group VIII of the periodic table;
  0.01% to 6% of phosphorus as a doping element (optionally in combination with boron and/or silicon);
  and a non-zeolitic support based on alumina-silica;
  said alumina-silica having the following characteristics:
    a percentage of silica in the range 5% to 95% by weight, preferably in the range 10% to 80%, more preferably in the range 20% to 60% and still more preferably in the range 30% to 50%;
    a sodium content of less than 0.03% by weight;
    a total pore volume, measured by mercury porosimetry, in the range 0.45 to 1.2 ml/g;
    a porosity such that:
      i) the volume of mesopores with a diameter in the range 40 to 150 Å and a mean pore diameter in the range 80 to 140 Å (preferably in the range 80 to 120 Å) represents 30-80% of the total pore volume measured by mercury porosimetry;
      ii) the volume of macropores with a diameter of more than 500 Å represents 20-70% of the total pore volume measured by mercury porosimetry;
    a BET specific surface area in the range 100 to 550 m$^2$/g, preferably in the range 150 to 500 m$^2$/g, more preferably less than 350 m$^2$/g, still more preferably less than 250 m$^2$/g;

an X ray diffraction diagram which contains at least the characteristic principal peaks of at least one transition alumina included in the group composed of alpha, rho, khi, eta, gamma, kappa, theta and delta aluminas.

DETAILED DESCRIPTION OF THE INVENTION

Characterization Techniques

In the following description, the term "specific surface area" means the BET specific surface area determined by nitrogen adsorption in accordance with ASTM D 3663-78 established using the BRUNAUER-EMMETT-TELLER method described in "The Journal of the American Society", 60, 309 (1938).

In the following description, the term "mercury volume" of catalyst supports means the volume measured by mercury porosimetric intrusion in accordance with ASTM D4284-83 at a maximum pressure of 4000 bars, using a surface tension of 484 dynes/cm and a contact angle for amorphous silica-alumina catalysts of 140°. One reason why it is preferable to use a support as a basis to define the pore distribution arises from the fact that the mercury contact angle varies after impregnating the metals as a function of the nature and type of metal. The wetting angle is taken to be 140°, following the recommendations in the work "Techniques de l'ingenieur, traite analyse et caracterisation", pages 1050-5, by Jean Charpin and Bernard Rasneur.

For greater accuracy, the value of the mercury volume in ml/g given in the text below corresponds to the total mercury volume (total pore volume measured by intrusion mercury porosimetry) in ml/g measured for the sample minus the value of the mercury volume in ml/g measured for the same sample for a pressure corresponding to 30 psi (about 2 bars). The mean mercury diameter is also defined as the diameter for which all pores with a size less than this diameter constitute 50% of the total mercury pore volume.

To better characterize the pore distribution, we finally define the following criteria for the mercury pore distribution characteristics: volume V1 corresponds to the volume contained in pores for which the diameter is less than the mean diameter minus 30 Å. Volume V2 corresponds to the volume contained in pores with a diameter greater than or equal to the mean diameter minus 30 Å and less than the mean diameter plus 30 Å. Volume V3 corresponds to the volume contained in pores with a diameter greater than or equal to the mean diameter plus 30 Å. Volume V4 corresponds to the volume contained in pores with a diameter of less than the mean diameter minus 15 Å. Volume V5 corresponds to the volume contained in pores with a diameter greater than or equal to the mean diameter minus 15 Å and less than the mean diameter plus 15 Å. Volume V6 corresponds to the volume contained in pores with a diameter greater than or equal to the mean diameter plus 15 Å.

The pore distribution measured by nitrogen adsorption is determined by the Barrett-Joyner-Halenda model (BJH). The nitrogen adsorption-desorption isotherm using the BJH model is described in the periodical "The Journal of the American Society", 73, 373 (1951) by E P Barrett, L G Joyner and P P Halenda. In the description below, the term "nitrogen adsorption volume" means the volume measured for $P/P_0=0.99$, the pressure at which it is assumed that the nitrogen has filled all of the pores. The mean nitrogen desorption diameter is defined as a diameter such that all of the pores below this diameter constitute 50% of the pore volume ($V_p$) measured on the nitrogen isotherm desorption branch.

The term "surface adsorption" means the surface measured on the adsorption isotherm branch. Reference should be made to the article by A Lecloux in "Mémoires de la Societe Royale des Sciences de Liège", 6$^{th}$ series, volume 1, section 4, pp 169-209 (1971).

The sodium content is measured by atomic absorption spectrometry.

X ray diffraction is a technique which can be used to characterize the supports and catalysts of the invention. In the description below, the X ray analysis was carried out on powder with a Philips PW 1830 diffractometer operating in reflection mode and provided with a back monochromator using the CoKalpha radiation line ($\lambda K_{\alpha 1}=1.7890$ Å, $\lambda K_{\alpha 2}=1.793$ Å, $K_{\alpha 1}/K_{\alpha 2}$ intensity ratio=0.5). Reference should be made to the ICDD database, number 10-0425, for the X ray diffraction diagram of gamma alumina. In particular, the 2 most intense peaks are located at a position corresponding to a d in the range 1.39 to 1.40 Å and to a d in the range 1.97 Å to 2.00 Å. The term "d" is the interplanar spacing which is deduced from the angular position using the Bragg relationship ($2d_{(hkl)}*\sin(\theta)=n*\lambda$). The term "gamma alumina" as used in the remainder of the text means, inter alia, for example, an alumina included in the group composed of cubic gamma, pseudo-cubic gamma, tetragonal gamma, low crystallinity or poorly crystallized gamma, high surface area gamma, low surface area gamma, gamma from coarse boehmite, gamma from crystalline boehmite, gamma from low crystallinity or poorly crystallized boehmite, gamma from a mixture of crystalline boehmite and an amorphous gel, gamma from an amorphous gel, and gamma developing towards delta alumina. Reference should be made to the article by B C Lippens, J J Steggerda in "Physical and Chemical Aspects of Adsorbents and Catalysts" by E G Linsen (Ed), Academic Press, London, 1970, p 171-211 for the diffraction peaks for eta, delta and theta aluminas.

For the supports and catalysts of the invention, the X ray diffraction diagram discloses a broad peak which is characteristic of the presence of amorphous silica.

Further, in the following text, the alumina compound may contain an amorphous fraction which is difficult to detect by XRD techniques. This therefore means that the alumina compounds used or described in the text may contain an amorphous fraction or a fraction with poor crystallinity.

The supports and catalysts of the invention were analyzed by solid $^{27}$Al MAS NMR using a Brüker MSL 400 type spectrometer with a 4 mm probe. The sample rotation rate was of the order of 11 kHz. Aluminium NMR can potentially distinguish between three types of aluminium which have the following chemical displacements:

Between 100 and 40 ppm, tetra-coordinated type aluminium, $Al_{IV}$;

Between 40 and 20 ppm, penta-coordinated type aluminium, $Al_V$;

Between 20 and −100 ppm, hexa-coordinated type aluminium, $Al_{VI}$;

The aluminium atom is a quadripolar nucleus. Under certain analytical conditions (weak radiofrequency field: 30 kHz, low pulse angle: π/2 and water-saturated sample), magic angle spinning (MAS) NMR is a quantitative technique. The decomposition of MAS NMR spectra provides direct access to the quantities of the various species. The spectrum is calibrated as the chemical displacement with respect to a 1 M aluminium nitrate solution. The aluminium signal is at zero ppm. We elected to integrate the signals between 100 and 20 ppm for $Al_{IV}$ and $Al_V$, which corresponds to area 1, and between 20 and −100 for $Al_{VI}$ which corresponds to area 2. In the following description, the term "proportion of octahedral $Al_{VI}$" means the following ratio: area 2/(area 1+area 2).

The silicon environment in the alumina-silicas was studied by $^{29}Si$ NMR. The tables of chemical displacement as a function of the degree of condensation were deduced from the work by G Engelhardt and D Michel: "High resolution solid-state NMR of silicates and zeolites" (Wiley), 1987.

29 Si NMR shows the chemical displacements of different species of silicon such as $Q^4$ (−105 ppm to −120 ppm), $Q^3$ (−90 ppm to −102 ppm) and $Q^2$ (−75 ppm to −93 ppm). Sites with a chemical displacement at −102 ppm may be sites of type $Q^3$ or $Q^4$, which we have termed $Q^{3-4}$ sites. The sites are defined as follows:

$Q^4$ sites: Si bonded to 4Si (or Al);
$Q^3$ sites: Si bonded to 3 Si (or Al) and 1 OH;
$Q^2$ sites: Si bonded to 2 Si (or Al) and 2 OH;

The alumina-silicas of the invention are composed of silicon of types $Q^2$, $Q^3$, $Q^{3-4}$ and $Q^4$. Many species will be of type $Q^2$, approximately of the order of 10% to 80%, preferably 20% to 60% and more preferably 20% to 40%. The proportion of $Q^3$ and $Q^{3-4}$ species is also high, approximately of the order of 5% to 50% and preferably 10% to 40% for the two species.

The environment for the silicon atoms was studied by MAS NMR CP $^1H->^{29}Si$ (300 MHz, rotation rate: 4000 Hz). In this case, only silicon bonded to OH bonds responds. The table of chemical displacements used was that from Kodakari et al, Langmuir 14, 4623-4629, 1998. The following attributions are made: −108 ppm ($Q^4$), −99 ppm ($Q^3/Q^4$(1 Al)), −91 ppm ($Q^3/Q^3$(1Al)), −84 ppm ($Q^2/Q^3$(2Al)), −78 ppm ($Q^2/Q^3$(3Al)) and −73 ppm ($Q^1/Q^2$(3Al)).

The alumina-silicas of the invention are in the form of a superimposition of several masses. The principal peak of these masses is generally located at −110 ppm.

One method for characterizing the supports of the invention which may be used is transmission electron microscopy (TEM). To this end, an electron microscope (of the Jeol 2010 or Philips Tecnai20F type, with optional scanning) was used, provided with an energy dispersion spectrometer (EDS) for X ray analysis (for example a Tracor or Edax). The EDS detector has to allow detection of light elements. The combination of the two tools, TEM and EDS, can combine imagery and local chemical analysis with good spatial resolution.

For this type of analysis, the samples are finely ground in a mortar; the powder is then included in resin to produce ultrafine sections with a thickness of about 70 nm. Such sections are collected on copper grids coated with a film of perforated amorphous carbon acting as a support. They are then introduced into the microscope for observation and analysis under high vacuum. With imagery, the sample zones are readily distinguished from the resin zones. A certain number of analyses are then carried out, a minimum of 10, preferably in the range 15 to 30, on different zones of the industrial sample. The size of the electron beam for zone analysis (approximately determining the size of the analyzed zones) is 50 nm in diameter as a maximum, preferably 20 nm, and more preferably 10, 5, 2 or 1 nm in diameter. In scanning mode, the analyzed zone will be a function of the size of the scanned zone and not the size of the beam, which is generally less.

Semi-quantitative processing of X ray spectra recorded using the EDS spectrometer can produce the relative concentration of Al and Si (as an atomic %) and the Si/Al ratio for each of the analyzed zones. The mean, $Si/Al_m$, and the standard deviation, $\sigma$, of this set of measurements can then be calculated. In the non-limiting examples of the description which follows, the 50 nm probe was used to characterize the supports and catalysts of the invention unless otherwise indicated.

The settled packing density (SPD) is measured as described in "Applied Heterogeneous Catalysis" by J F Le Page, J Cosyns, P Courty, E Freund, J-P Franck, Y Jacquin, B Juguin, C Marcilly, G Martino, J Miquel, R Montamal, A Sugier, H Van Landehchem, Technip, Paris, 1987. A suitably sized graduated cylinder is filled by successive additions and, between two successive additions, the catalyst is settled by shaking the cylinder to constant volume. This measurement is generally carried out on 1000 $cm^3$ of catalyst packed into a cylinder with a height to diameter ratio of close to 5:1. This measurement is preferably carried out using automated apparatus such as the Autotap® sold by Quantachrome®.

The acidity of the matrix is measured by infrared spectrometry (IR). The IR spectra are recorded on a Nicolet Nexus-670 type interferometer at a resolution of 4 $cm^{-1}$ with Happ-Gensel type apodisation. The sample (20 mg) is pressed into a self-supporting pellet and placed in an in situ analytical cell (25° C. to 550° C., furnace offset from IR beam, high vacuum of $10^{-6}$ mbars). The pellet diameter is 16 mm.

The sample is pre-treated as follows to eliminate physisorbed water and to partially dehydroxylate the catalyst surface to provide an image which is representative of the catalyst acidity when in operation:

temperature rise from 25° C. to 300° C. over 3 hours;
iso-temperature for 10 hours at 300° C.;
temperature fall from 300° C. to 25° C. over 3 hours.

The basic probe (pyridine) is then adsorbed at saturated pressure at 25° C. then thermo-desorbed in the following stages:

25° C. for 2 hours under high vacuum;
100° C. for 1 hour under high vacuum;
200° C. for 1 hour under high vacuum;
300° C. for 1 hour under high vacuum.

A spectrum is recorded at 25° C. at the end of the pre-treatment and at each desorption stage in transmission mode with an accumulation time of 100 s. The spectra are recorded at iso-mass (and thus assumed to be iso-thickness) (exactly 20 mg). The number of Lewis sites is proportional to the surface area of the peak with a maximum near 1450 $cm^{-1}$, including shoulders. The number of Bronsted sites is proportional to the surface area of the peak with a maximum near 1545 $cm^{-1}$. The ratio of the number of Bronsted sites/number of Lewis sites, B/L, is estimated to be equal to the ratio of the surface areas of the two peaks described above. In general, the surface areas of the peaks at 25° C. are used. This ratio B/L is generally calculated from the spectrum recorded at 25° C. at the end of pre-treatment.

When a doping element, P and/or B and/or Si, is introduced, its distribution and location may be determined by techniques such as a Castaing microprobe (distribution profile of the various elements), a transmission electron microscope coupled to X ray analysis of the catalyst components, or by establishing a distribution map of the elements present in the catalyst by electron microprobe. These techniques can show the presence of these exogenous elements added after synthesis of the alumina-silica of the invention.

The overall composition of the catalyst may be determined by X ray fluorescence of the catalyst in the powdered state or by atomic absorption after acid attack of the catalyst.

The local composition on the micronic scale, as opposed to the overall composition of the catalyst, may be measured by electron microprobe. This measurement may be made by determining the amounts of metal in zones of a few cubic microns along the diameter of a particle of catalyst which is termed the measurement unit. This measurement allows the macroscopic distribution of the elements inside the particles to be evaluated. It may optionally be supplemented on the nanometric scale by STEM (scanning transmission electron microscopy).

The analyses are carried out using a CAMECA SX100 electron microprobe (provided with 5 wavelength dispersion spectrometers) (preferred apparatus) or optionally using a JEOL 8800R (4 spectrometers). The acquisition parameters are as follows: acceleration voltage 20 kV, current 80 or 200 nA and count time 10 s or 20 s depending on the concentration. The particles are coated in resin then polished to diameter.

It should be noted that the term "diameter" does not refer solely to a shape of a bead or extrudate, but more generally to any particle shape; it is termed the "diameter" because it is the representative length of the particle on which the measurement is made.

The measurements are made on a representative sample of the bed or catalyst batch to be used in the catalytic bed. The analyses should be carried out on at least 5 particles with at least 30 measurements per particle, uniformly distributed along the diameter.

The local concentrations (expressed as a %) of molybdenum, nickel, tungsten and phosphorus are respectively termed CMo, CNi, CW and CP.

It is also possible to express the concentrations as an atomic %; the relative fluctuations are the same.

It may be advantageous to prepare catalysts with homogeneous concentrations CMo, CNi, CW and CP along the extrudate. It is also advantageous to prepare catalysts having different core and peripheral CMo, CNi, CW and CP concentrations. These catalysts have "dished" or "domed" distribution profiles. A further distribution type is the crust type where the elements of the active phase are distributed on the surface.

DESCRIPTION OF THE INVENTION

The present invention concerns a process for producing middle distillates using a hydrocracking/hydroisomerization catalyst which comprises:

- at least one hydrodehydrogenating element selected from the group formed by elements from group VIB and group VIII of the periodic table;
- 0.01% to 6% of phosphorus as a doping element (optionally in combination with boron and/or silicon);
- and a non-zeolitic support based on mesoporous alumina-silica;
- said alumina-silica having the following characteristics:
    - a percentage of silica in the range 5% to 95% by weight, preferably in the range 10% to 80%, more preferably in the range 20% to 60% and still more preferably in the range 30% to 50%;
    - a sodium content of less than 0.03% by weight;
    - a total pore volume, measured by mercury porosimetry, in the range 0.45 to 1.2 ml/g;
    - a porosity such that:
        - i) the volume of mesopores with a diameter in the range 40 to 150 Å and a mean pore diameter in the range 80 to 140 Å (preferably in the range 80 to 120 Å) represents 30-80% of the total pore volume measured by mercury porosimetry;
        - ii) the volume of macropores with a diameter of more than 500 Å represents 20-70% of the total pore volume measured by mercury porosimetry;
    - a BET specific surface area in the range 100 to 550 $m^2/g$, preferably in the range 150 to 500 $m^2/g$, more preferably less than 350 $m^2/g$, and still more preferably less than 250 $m^2/g$;
    - an X ray diffraction diagram which contains at least the characteristic principal peaks of at least one transition alumina included in the group composed of alpha, rho, khi, eta, gamma, kappa, theta and delta aluminas.

Characteristics of Catalyst for Use in the Process of the Invention

The catalyst of the invention thus comprises:
- preferably, a cationic impurities content of less than 0.1% by weight, preferably less than 0.05% by weight and more preferably less than 0.025% by weight. The term "cationic impurities content" means the total alkali content;
- preferably, an anionic impurities content of less than 1% by weight, more preferably less than 0.5% by weight and still more preferably less than 0.1% by weight;
- at least one hydrodehydrogenating element selected from the group formed by elements from group VIB and group VIII (preferably noble group VIII) of the periodic table;
- preferably, a group VIB metal(s) content, in the metallic form or in the oxide form, in the range 1 to 50% by weight, preferably in the range 1.5% to 35%, more preferably in the range 1.5% to 30%;
- preferably, a group VIII metals content, in the metallic form or in the oxide form, in the range 0.1% to 30% by weight, preferably 0.2% to 25% and more preferably in the range 0.2% to 20%;
- 0.01% to 6% of phosphorus as a doping element deposited on the catalyst (the term "doping element" means an element introduced after preparing the alumino-silicate support described above), optionally in combination with boron and/or silicon. Hence, it is possible to use, as doping elements, a phosphorus-boron combination or a combination of phosphorus, boron and silicon. When the elements boron and/or silicon are present on the catalyst, the amounts by weight of boron and silicon, calculated in their oxide form, are in the range 0.01% to 6%, preferably in the range 0.1% to 4%, more preferably in the range 0.2% to 2.5%;
- optionally, at least one group VIIB element (preferably manganese, for example), and a content in the range 0 to 20% by weight, preferably in the range 0 to 10% by weight of the compound in the oxide or metallic form;
- optionally, at least one group VB element (preferably niobium, for example), and a content in the range 0 to 40% by weight, preferably in the range 0 to 20% by weight of the compound in the oxide or metallic form;
- a non zeolitic support based on alumina-silica, said alumina-silica having the following characteristics:
    - a percentage of silica in the range 5% to 95% by weight, preferably in the range 10% to 80%, more preferably in the range 20% to 60% and still more preferably in the range 30% to 50%;
    - a sodium content of less than 0.03% by weight;
    - a total pore volume, measured by mercury porosimetry, in the range 0.45 to 1.2 ml/g;
    - a porosity such that:
    - i) the volume of mesopores with a diameter in the range 40 to 150 Å and a mean pore diameter in the range 80 to 140 Å (preferably in the range 80 to 120 Å) represents 30-80% of the total pore volume as defined above, preferably in the range 40% to 70%;

ii) the volume of macropores with a diameter of more than 500 Å, preferably in the range 1000 Å to 10000 Å, represents in the range 20% to 70% of the total pore volume and preferably in the range 30% to 60% of the total pore volume, and still more preferably the volume of the macropores represents at least 35% of the total pore volume;

a BET specific surface area in the range 100 to 550 m²/g, preferably in the range 150 to 500 m²/g, preferably less than 350 m²/g, still more preferably less than 250 m²/g;

an X ray diffraction diagram which contains at least the characteristic principal peaks of at least one of the transition aluminas comprised in the group composed of rho, khi, kappa, eta, gamma, theta and delta aluminas, preferably containing at least the characteristic principal peaks of at least one of the transition aluminas comprised in the group composed of gamma, eta, theta and delta aluminas, still more preferably containing the characteristic principal peaks of gamma and eta alumina, still more preferably containing peaks with a d in the range 1.39 to 1.40 Å and with a d in the range 1.97 Å to 2.00 Å;

Preferably, the alumina-silica comprises 30% to 50% of $Q^2$ sites, in which one Si atom is bonded to two atoms of Si or Al and to two OH groups and also comprises 10-30% of $Q^3$ sites in which one Si atom is bonded to three Si or Al atoms or to one OH group.

In a preferred mode of the invention, the catalyst support is constituted by alumina-silica alone.

In another implementation of the invention, the support comprises 1% to 40% by weight of binder. The support may thus result from a mixture of alumina-silica and at least one binder selected from the group formed by silica, alumina, clays, titanium oxide, boron oxide and zirconia.

In the catalyst, the proportion of octahedral $Al_{VI}$, determined by solid $^{27}Al$ MAS NMR spectral analysis, is generally over 50%.

The catalyst may also contain a minor proportion of at least one promoter element selected from the group formed by zirconia and titanium.

Preferably, the catalyst undergoes a post-synthesis hydrothermal treatment, as will be described below.

Preferably, the catalyst undergoes a sulphurization treatment, as will be described below.

Standard Activity Test: Evaluation of Catalysts of the Invention

The acidity and the hydrogenation performance of catalysts of the invention may be evaluated using a catalytic test carried out on a mixture of model molecules: hydrogenation of toluene and isomerization of cyclohexane.

The catalytic test allows hydrogenation to be controlled along with the acidity of the catalysts and is carried out in accordance with the following protocol:

The catalysts are sulphurized in situ dynamically in a tube reactor in a fixed traversed bed of a Catatest type pilot unit (Vinci Technologies), the fluids moving from top to bottom. The hydrogenating and isomerizing activity measurements are carried out immediately after sulphurization under pressure without opening to air, with the hydrocarbon feed which acted to sulphurize the catalysts.

The sulphurization and test feed is composed of 5.8% of dimethyldisulphide (DMDS), 20% of toluene and 74.2% of cyclohexane by weight. Hence, the stabilized catalytic activities of equal volumes of catalysts are measured in the toluene hydrogenation reaction. The cyclohexane isomerization is monitored, with a toluene diluent, to determine the acidity of the catalysts.

The conditions for measuring the activity are as follows (assuming total vaporization and the perfect gas law):
Total pressure: 6.0 MPa
Toluene pressure: 0.38 MPa
Cyclohexane pressure: 1.55 MPa
Hydrogen pressure: 3.64 MPa
$H_2S$ pressure: 0.22 MPa
Catalyst volume: 40 c
Feed flow rate: 80 cc/h;
Hourly space velocity: 2 l/l/h
Hydrogen flow rate: 36 l/h;
Sulphurization and test temperature: 350° C. (3° C./min).

Samples of liquid effluent were analyzed by gas chromatography. The molar concentrations of unconverted toluene (T) were determined along with the concentrations of hydrogenation products: methyl cyclohexane (MCC6), ethyl cyclopentane (EtCC5) and dimethyl cyclopentanes (DMCC5) allowed the degree of toluene hydrogenation $X_{HYD}$ to be calculated, defined by:

$$X_{HYD}(\%)=100*(MCC6+EtCC5+DMCC5)/(T+MCC6+EtCC5+DMCC5)$$

The degree of cyclohexane isomerization, $X_{ISO}$, was calculated in the same manner from the concentrations of unconverted cyclohexane and its reaction product, methyl cyclopentane. Since the toluene hydrogenation reaction and cyclohexane isomerization reaction are of first order under our test conditions and the reactor behaves as an ideal piston reactor, the hydrogenating activity $A_{HYD}$ and isomerizing activity $A_{ISO}$ of the catalysts is calculated by applying the formula: $Ai=Ln(100/(100-X_i))$ Advantageously, in the standard activity test, the catalyst of the invention has an activity $A_{HYD}$>0.7 and an activity $A_{ISOM}$>0.1, preferably $A_{HYD}$>0.9 and $A_{ISOM}$>0.12, more preferably $A_{HYD}$>1.2 and $A_{ISOM}$>0.13, and still more preferably $A_{HYD}$>1.4 and $A_{ISOM}$>0.13.

The ratio of the hydrogenating activity to the isomerizing activity H/A is equal to $A_{HYD}/A_{ISO}$.

The ratio of the hydrogenating activity to the isomerizing activity, H/A, is advantageously in the range 6.5 to 30, preferably in the range 7 to 30, more preferably in the range 7.5 to 25, more preferably in the range 8.5 to 20 and still more preferably in the range 9.5 to 15.

When the doping element is phosphorus, the phosphorus content is advantageously in the range 0.01% to 4% by weight of oxide, more preferably in the range 0.01% to 2.5% by weight of oxide.

Preferably, the hydrocracking/hydroisomerization catalyst is based on platinum and/or palladium.

Highly preferably, the hydrocracking/hydroisomerization catalyst contains 0.05% to 10% of noble metal from group VIII.

A preferred catalyst of the invention comprises the combination of platinum and palladium and a phosphorus content in the range 0.01% to 4% by weight of oxide.

A preferred catalyst of the invention comprises a combination of platinum and palladium and a phosphorus content in the range 0.01% to 2.5% by weight of oxide.

The catalyst may also contain a minor proportion of at least one stabilizing element selected from the group formed by zirconium and titanium.

Preparation Processes

The catalysts of the invention may be prepared using any method known to the skilled person.

A preferred process for preparing a catalyst of the present invention comprises the following steps:

In a preferred preparation method, the precursor is obtained by direct forming of the alumina-silica alone or by forming the alumina-silica with at least one binder, then drying and calcining. The group VIB and/or VIII elements, and optionally those selected from phosphorus, boron, silicon and optional elements from groups VB and VIIB, may then optionally be introduced using any method known to the skilled person, before or after forming and before or after calcining the precursor or catalyst.

The hydrogenating element may be introduced at any stage of the preparation, preferably during mixing, or more preferably after forming. Forming is followed by calcining; the hydrogenating element may also be introduced before or after calcining. The preparation is generally completed by calcining at a temperature of 250° C. to 600° C. A further preferred method of the present invention consists of forming the alumina-silica without a binder after mixing the latter, then passing the paste obtained through a die to form extrudates with a diameter in the range 0.4 to 4 mm. The hydrogenating function may then be introduced in part alone (in the case, for example, of combinations of oxides of group VIB and VIII metals) or completely, at the moment of mixing. It may also be introduced by one or more ion exchange operations into the calcined support constituted by at least one alumina-silica, optionally formed with a binder, using solutions containing precursor salts of the selected metals when these belong to group VIII. It may also be introduced by one or more operations for impregnation of the formed and calcined support, using a solution of precursors of oxides of metals from groups VIII (in particular cobalt and nickel) when the precursors of the oxides of metals from group VIB (in particular molybdenum or tungsten) have already been introduced on mixing the support. Finally, it may also be introduced, highly preferably by one or more operations for impregnating the calcined support constituted by at least one alumina-silica of the invention and optionally at least one binder, using solutions containing precursors of oxides of metals from groups VI and/or VIII, precursors of oxides of metals from group VIII preferably being introduced after those from group VIB or at the same time thereas.

Preferably, the support is impregnated using an aqueous solution. Impregnation of the support is preferably carried out using the "dry" impregnation method which is well known to the skilled person. Impregnation may be carried out in a single step using a solution containing all of the constituent elements of the final catalyst.

The catalyst of the present invention may thus comprise at least one element from group VIII such as iron, cobalt, nickel, ruthenium, rhodium, palladium, osmium, iridium or platinum. Preferred examples of group VIII metals are metals selected from the group formed by iron, cobalt, nickel, platinum, palladium and ruthenium. The catalyst of the invention may also comprise at least one element from group VIB, preferably tungsten or molybdenum. Advantageously, the following combinations of metals are used: nickel-molybdenum, cobalt-molybdenum, iron-molybdenum, iron-tungsten, nickel-tungsten, cobalt-tungsten, platinum-palladium; preferred combinations are: nickel-molybdenum, cobalt-molybdenum, cobalt-tungsten and more advantageously platinum-palladium and nickel-tungsten. It is also possible to use combinations of three metals, for example nickel-cobalt-molybdenum, nickel-molybdenum-tungsten, nickel-cobalt-tungsten. Advantageously, the following combinations are used: nickel-niobium-molybdenum, cobalt-niobium-molybdenum, iron-niobium-molybdenum, nickel-niobium-tungsten, cobalt-niobium-tungsten, iron-niobium-tungsten; preferred combinations are: nickel-niobium-molybdenum, cobalt-niobium-molybdenum. It is also possible to use combinations of four metals, for example nickel-cobalt-niobium-molybdenum. It is also possible to use combinations containing a noble metal such as ruthenium-niobium-molybdenum or ruthenium-nickel-niobium-molybdenum.

At least one of the following elements: phosphorus and/or boron and/or silicon and possibly element(s) selected from groups VIIB and VB are introduced into the catalyst at any stage of the preparation using any technique which is known to the skilled person.

A preferred method of the invention consists of depositing the selected doping element or elements onto the precursor, which may or may not have been calcined, preferably calcined. To deposit boron, for example, an aqueous solution of at least one boron salt such as ammonium biborate or ammonium pentaborate is prepared in an alkaline medium and in the presence of hydrogen peroxide and dry impregnation is then carried out in which the pore volume of the precursor is filled with the solution containing boron, for example. In the case in which silicon is also deposited, for example, a solution of a silicone type silicon compound or a silicon oil emulsion is used.

Boron and silicon may also be deposited simultaneously using, for example, a solution containing a boron salt and a silicone type silicon compound. Thus, for example in the case in which the precursor is a nickel-tungsten type catalyst supported on alumina-silica, it is possible to impregnate this precursor using an aqueous solution of ammonium biborate and Rhodorsil E1P silicone from Rhodia, to dry, for example at 120° C., then to impregnate with a solution of ammonium fluoride, to dry at 120° C. for example, and then to calcine, for example and preferably in air in a traversed bed, for example at 500° C. for 4 hours.

The doping element selected from the group formed by phosphorus, silicon and boron and the group VIIB and VB elements may be introduced using one or more impregnation operations using an excess of solution on the calcined precursor.

When at least one doping element, P and optionally B and/or Si, is introduced, its distribution and location may be determined by techniques such as a Castaing microprobe (distribution profile of the various elements), a transmission electron microscope coupled to X ray analysis of the catalyst components, or by establishing a distribution map of the elements present in the catalyst by electron microprobe. These techniques can show the presence of these exogenous elements added after synthesis of the alumina-silica of the invention.

It may be advantageous to prepare catalysts having homogeneous concentrations $C_{Mo}$, $C_{Ni}$, $C_W$ and $C_P$ along the extrudate. It is also advantageous to prepare catalysts having different core and peripheral $C_{Mo}$, $C_{Ni}$, $C_W$ and $C_P$ concentrations. These catalysts have "dished" or "domed" distribution profiles. A further distribution type is the crust type where the elements of the active phase are distributed on the surface.

In general, the core/periphery ratio of the concentrations $C_{Mo}$, $C_{Ni}$, $C_W$ and $C_P$ is in the range 0.1 to 3. In a variation of the invention, it is in the range 0.8 to 1.2. In a further variation of the invention, the core/periphery ratio for concentrations $C_P$ is in the range 0.3 to 0.8.

The preferred phosphorus source is orthophosphoric acid $H_3PO_4$, but salts and esters such as ammonium phosphates are also suitable. Phosphorus may, for example, be introduced in the form of a mixture of phosphoric acid and a basic organic compound containing nitrogen, such as ammonia, primary and secondary amines, cyclic amines, compounds from the pyridine family and quinolines and compounds from the pyrrole family. Tungsto-phosphoric or tungsto-molybdic acids may be used.

The amount of phosphorus is adapted, without limiting the scope of the invention, to form a mixed compound in solution and/or on the support, for example tungsten-phosphorus or molybdenum-tungsten-phosphorus. Said mixed compounds may be heteropolyanions. These compounds may be Anderson heteropolyanions, for example. The phosphorus content, expressed in its $P_2O_5$ form, is in the range 0.01% to 6% by weight, preferably in the range 0.1% to 4% by weight, highly preferably in the range 0.01% to 2.5%.

The boron source may be boric acid, preferably orthoboric acid $H_3BO_3$, ammonium biborate or pentaborate, boron oxide, boric esters. The boron may, for example, be introduced in the form of a mixture of boric acid, hydrogen peroxide and a basic organic compound containing nitrogen such as ammonia, primary and secondary amines, cyclic amines, compounds from the pyridine family and quinolines and compounds from the pyrrole family. The boron may, for example, be introduced using a solution of boric acid in a water/alcohol mixture.

Many sources of silicon may be used. It is possible to use ethyl orthosilicate $Si(OEt)_4$, siloxanes, polysiloxanes, silicones, silicone emulsions, halogenated silicates such as ammonium fluorosilicate $(NH_4)_2SiF_6$ or sodium fluorosilicate $Na_2SiF_6$. Silicomolybdic acid and its salts, silicotungstic acid and its salts may also advantageously be used. The silicon may, for example, be added by impregnating ethyl silicate in solution in a water/alcohol mixture. The silicon may, for example, be added by impregnating a silicone type silicon compound or silicic acid suspended in water.

The group VIB or group VIII metals of the catalyst of the present invention may be present completely or partially in the form of a metal and/or oxide and/or sulphide.

Examples of sources of molybdenum and tungsten which may be used are oxides and hydroxides, molybdic and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts.

Sources of group VIII elements which may be used are well known to the skilled person. Examples of non noble metals are nitrates, sulphates, hydroxides, phosphates, halides, for example chlorides, bromides or fluorides and carboxylates, for example acetates and carbonates. For noble metals, halides may be used, for example chlorides, nitrates, acids such as chloroplatinic acid or oxychlorides such as ammoniacal ruthenium oxychloride.

Preferably, no other halogens apart from those introduced on impregnation are added, the halogen preferably being chlorine.

Preparation of Support

The support may be constituted by pure alumina-silica or may result from mixing, with said alumina-silica, a binder such as silica $(SiO_2)$, alumina $(Al_2O_3)$, clays, titanium oxide $(TiO_2)$, boron oxide $(B_2O_3)$ and zirconia $(ZrO_2)$ with any mixture of the binders cited above. Preferred binders are silica and alumina, more preferably alumina in all of the forms known to the skilled person, for example gamma alumina. The amount of binder in the catalyst support is in the range 0 to 40% by weight, more particularly in the range 1% to 40%, still more preferably in the range 5% to 20%. However, the catalysts of the invention in which the support is constituted by alumina-silica alone with no binder are preferred.

The support may be prepared by forming the alumina-silica in the presence or absence of binder using any technique known to the skilled person.

Throughout the methods cited above, it may be desirable to add, during any step of the preparation, a minor proportion of at least one promoter element selected from the group formed by zirconia and titanium.

Catalyst and Support Forming

The support may be formed by forming the alumina-silica using any technique which is known to the skilled person. Forming may, for example, be carried out by extrusion, pelletization, by the oil drop coagulation method, by rotating plate granulation or by any other method which is known to the skilled person.

Forming may also be carried out in the presence of various constituents of the catalyst and extrusion of the mineral paste obtained, by pelletization, by forming into beads on a rotating bowl granulator or drum, by oil drop coagulation, oil-up coagulation or by any other known method for agglomerating a powder containing alumina and optionally other ingredients selected from those mentioned above.

The catalysts used in the present invention have the shape of spheres or extrudates. However, it is advantageous for the catalyst to be in the form of extrudates with a diameter in the range 0.5 to 5 mm, more particularly in the range 0.7 to 2.5 mm. The shapes are cylindrical (which may or may not be hollow), twisted cylinders, multilobes (2, 3, 4 or 5 lobes, for example), or rings. The cylindrical shape is preferably used, but any other form may be used.

Further, said supports used in the present invention may have been treated, as is well known to the skilled person, by additives to facilitate forming and/or to improve the final mechanical properties of the silica-alumina supports. Examples of additives which may be cited are cellulose, carboxymethyl cellulose, carboxyethyl cellulose, tall oil, xanthan gums, surfactants, flocculating agents such as polyacrylamides, carbon black, starches, stearic acid, polyacrylic alcohol, polyvinyl alcohol, biopolymers, glucose, polyethylene glycols, etc.

Partial adjustment of the characteristic porosity of the supports of the invention is carried out during this step for forming the support particles.

Forming may be carried out using catalyst forming techniques which are known in the art, such as extrusion, pelletization, spray drying or drageification.

Water may be added or removed to adapt the viscosity of the paste to be extruded. This step may be carried out at any stage of the mixing step. In the case of alumino-silicate supports, it may be advantageous to reduce the quantity of water in the paste to increase the mechanical strength of the paste. This generally results in a reduction in the total volume for an optimum acid content.

To adapt the solid material content of the paste to be extruded to render it extrudable, it is also possible to add a mainly solid compound, preferably an oxide or hydrate. Preferably, a hydrate is used, more preferably an aluminium hydrate. The loss on ignition of the hydrate is more than 15%.

The amount of acid added on mixing before forming is less than 30%, preferably in the range 0.5% to 20% by weight of the anhydrous mass of silica and alumina engaged in the synthesis.

Extrusion may be carried out using any conventional tool which is on the market. The paste issuing from the mixing step is extruded through a die, for example using a piston or a single or twin extrusion screw. This extrusion step may be carried out using any method which is known to the skilled person.

The support extrudates of the invention generally have a crush strength of at least 70 N/cm, more preferably 100 N/cm or more.

Calcining the Support

Drying is carried out using any technique which is known to the skilled person.

To obtain the support of the present invention, it is preferable to calcine in the presence of molecular oxygen, for example by flushing with air, at a temperature of 1100° C. or less. At least one calcining step may be carried out after any one of the preparation steps. This treatment may, for example, be carried out in a traversed bed, swept bed or in a static atmosphere. As an example, the furnace used may be a rotary furnace or a vertical furnace with radial flow layers. The calcining conditions—temperature and duration—principally depend on the maximum catalyst service temperature. The preferred calcining conditions are between more than one hour at 200° C. and less than one hour at 1100° C. Calcining may be carried out in the presence of steam. Final calcining may optionally be carried out in the presence of an acidic or basic vapour. As an example, calcining may be carried out in a partial pressure of ammonia.

Post-Synthesis Treatments

Post-synthesis treatments may be carried out to improve the properties of the support, in particular its homogeneity as defined above.

In one preferred implementation, the post-synthesis treatment is a hydrothermal treatment. The hydrothermal treatment is carried out using any technique which is known to the skilled person. The term "hydrothermal treatment" means contact at any stage of the manufacture of the mixed support with water in the vapour phase or in the liquid phase. The term "hydrothermal treatment" encompasses maturation, steaming, autoclaving, calcining in moist air, and rehydration. Without restricting the scope of the invention, such a treatment may have the effect of rendering the silica component mobile.

According to the invention, maturation may take place before or after forming. In a preferred mode of the invention, hydrothermal treatment is carried out by steaming in a furnace in the presence of water vapour. The temperature during steaming may be in the range 600° C. to 1100° C., preferably over 700° C. for a period in the range 30 minutes to 3 hours. The steam content is more than 20 g of water per kg of dry air and preferably more than 40 g of water per kg of dry air, more preferably more than 100 g of water per kg of dry air. Such a treatment may, if required, completely or partially replace the calcining treatment.

The support may then optionally undergo hydrothermal treatment in a confined atmosphere. The term "hydrothermal treatment in a confined atmosphere" means treatment using an autoclave in the presence of water at a temperature which is above ambient temperature.

During said hydrothermal treatment, the formed alumina-silica may be treated in different manners. Thus, the alumina-silica may be impregnated with acid prior to its entry into the autoclave, alumina-silica autoclaving being carried out either in the vapour phase or in the liquid phase; said vapour or liquid phase in the autoclave may or may not be acidic. Impregnation prior to autoclaving may or may not be acidic. Said impregnation prior to autoclaving may be carried out dry or by immersing the silica-alumina or support in an aqueous acidic solution. The term "dry impregnation" means bringing the alumina into contact with a volume of solution which is less than or equal to the total pore volume of the treated alumina. Preferably, dry impregnation is carried out.

The autoclave is preferably a rotating basket autoclave such as that defined in EP-A-0 387 109.

The temperature during autoclaving may be in the range 100° C. to 250° C. for a period in the range 30 minutes to 3 hours.

Implementations of the Process of the Invention.

BRIEF DESCRIPTION OF DRAWINGS

Preferred implementational modes of the invention will be described below with reference to FIGS. 1 to 6, wherein each of these

Figure 1:
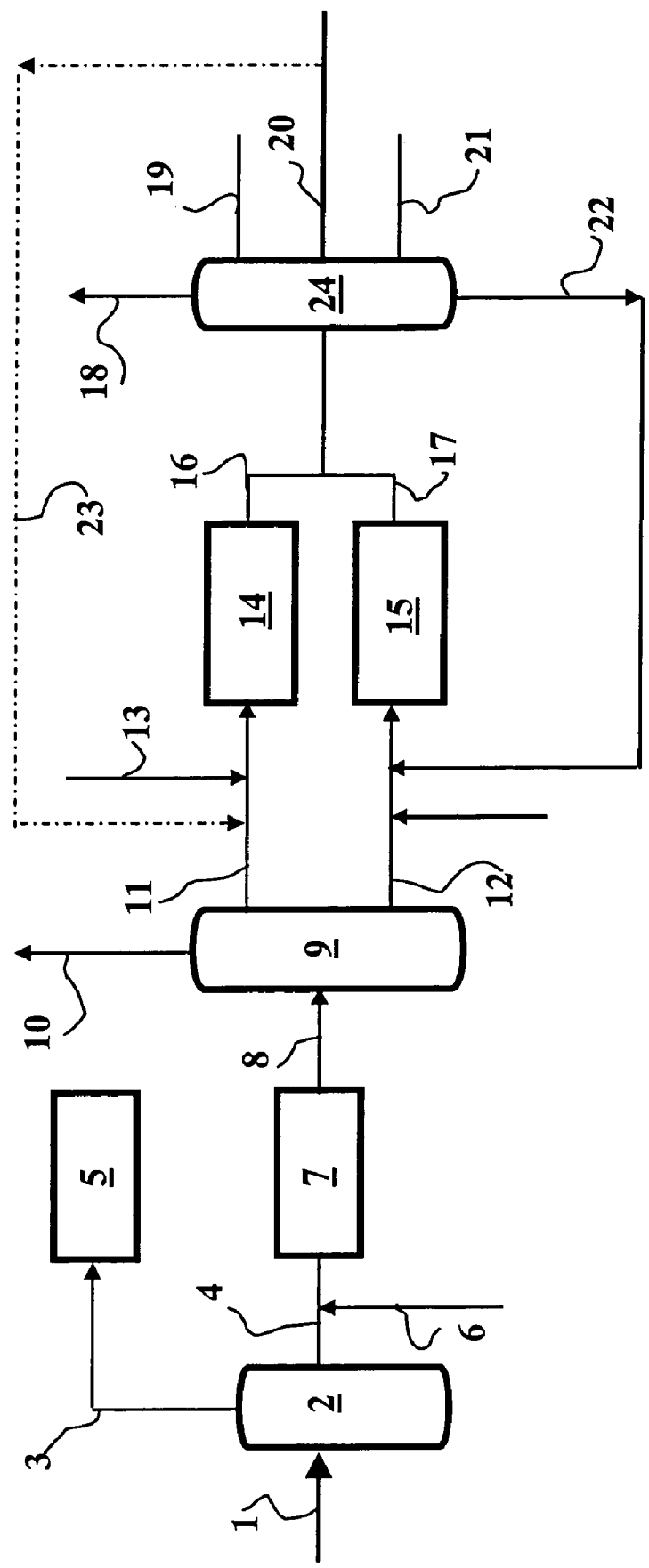
FIGS. 1-6 is a schematic flowsheet described in detail hereinafter.

One implementation of the invention comprises the following steps:
a) separating a single fraction, termed the heavy fraction, with an initial boiling point in the range 120-200° C.;
b) hydrotreating at least a portion of said heavy fraction;
c) fractionating into at least 3 fractions:
   at least one intermediate fraction having an initial boiling point T1 in the range 120° C. to 200° C., and an end point T2 of more than 300° C. and less than 410° C.;
   at least one light fraction boiling above the intermediate fraction;
   at least one heavy fraction boiling above the intermediate fraction;
d) passing at least a portion of said intermediate fraction through a process of the invention over a non-zeolitic hydroisomerization/hydrocracking catalyst;
e) passing at least a portion of said heavy fraction through a process of the invention over a non-zeolitic hydroisomerization/hydrocracking catalyst;
f) distilling hydrocracked/hydroisomerized fractions to obtain middle distillates, and recycling the residual fraction boiling above said middle distillates in step e) over the catalyst treating the heavy fraction.

A deatiled description of this implementation will be made with reference to FIG. 1 which constitutes a non-limiting interpretation.

Step a)

The effluent from the Fischer-Tropsch synthesis unit arriving via line 1 is fractionated (for example by distillation) in a separation means 2 into at least two fractions: at least one light fraction and a heavy fraction with an initial boiling point equal to a temperature in the range 120° C. to 200° C., preferably in the range 130° C. to 180° C. and still more preferably at a temperature of about 150° C.; in other words, the cut point is located between 120° C. to 200° C. The light fraction of FIG. 1 leaves via line 3 and the heavy fraction leaves via line 4.

This fractionation may be carried out using methods which are well known to the skilled person, such as flash, distillation, etc. By way of non-limiting example, the effluent from the Fischer-Tropsch synthesis unit undergoes flash, decanting to eliminate water and distillation to obtain at least the two fractions described above.

The light fraction is not treated using the process of the invention but may, for example, constitute a good feed for petrochemistry and more particularly for a steam cracking unit 5. The heavy fraction described above is treated using the process of the invention.

Step b)

This fraction is admitted in the presence of hydrogen (line 6) into a zone 7 containing a hydrotreatment catalyst which is aimed at reducing the amount of unsaturated olefinic compounds and to hydrotreat the oxygen-containing compounds (alcohols) present in the heavy fraction described above.

The catalysts used in said step b) are non-cracking or low cracking hydrotreatment catalysts comprising at least one metal from group VIII and/or group VI of the periodic table.

Advantageously, at least one element selected from P, B, Si is deposited on the support.

Said catalysts may be prepared using any method known to the skilled person or may be acquired from firms specializing in the fabrication and sale of catalysts.

In the hydrotreatment reactor 7, the feed is brought into contact in the presence of hydrogen and catalyst at operating temperatures and pressures that can carry out hydrodeoxygenation (HDO) of alcohols and hydrogenation of olefins present in the feed. The reaction temperatures used in the hydrotreatment reactor are in the range 100° C. to 350° C., preferably in the range 150° C. to 300° C., more preferably in the range 150° C. to 275° C. and still more preferably in the range 175° C. to 250° C. The total pressure range used varies from 5 to 150 bars, preferably 10 to 100 bars and more preferably between 10 and 90 bars. The hydrogen which supplies the hydrotreatment reactor is introduced at a rate such that the hydrogen/hydrocarbon volume ratio is in the range 100 to 3000 Nl/l/h, preferably in the range 100 to 2000 Nl/l/h and more preferably in the range 250 to 1500 Nl/l/h. The flow rate of the feed is such that the hourly space velocity is in the range 0.1 to 10 $h^{-1}$, preferably in the range 0.2 to 5 $h^{-1}$, and more preferably in the range 0.2 to 3 $h^{-1}$. Under these conditions, the amount of unsaturated molecules and oxygen-containing molecules is reduced to less than 0.5% and in general to less than 0.1%. The hydrotreatment step is carried out under conditions such that the conversion into products having boiling points of 370° C. or more into products having boiling points of less than 370° C. is limited to 30% by weight, preferably is less than 20% and still more preferably less than 10%.

Step c)

The effluent from the hydrotreatment reactor is supplied via a line 8 to a fractionation zone 9 where it is fractionated into at least three fractions:

- at least one light fraction (leaving via line 10) the constituent compounds of which have boiling points lower than a temperature T1 in the range 120° C. to 200° C., preferably in the range 130° C. to 180° C. and more preferably at a temperature of about 150° C. In other words, the cut point is between 120° C. and 200° C.;
- at least one intermediate fraction (line 11) comprising compounds the boiling points of which are in the range from the cut point T1 as defined above to a temperature T2 of more than 300° C., more preferably more than 350° C. and less than 410° C. or preferably less than 370° C.;
- at least one heavy fraction (line 12) comprising compounds having boiling points over the cut point T2 as defined above.

Fractionation is carried out here by distillation, but it may be carried out in one or more steps and by means other than distillation.

This fractionation may be carried out by methods which are well known to the skilled person such as flash, distillation, etc.

The intermediate and heavy fractions described above are treated using the process of the invention.

Step d)

At least a portion of said intermediate fraction is then introduced (line 11), as well as an optional stream of hydrogen (line 13), into zone 14 containing the hydroisomerization/hydrocracking catalyst of the process of the present invention.

The operating conditions in which said step d) is carried out are as follows:

The pressure is maintained at between 2 and 150 bars, preferably between 5 and 100 bars and advantageously 10 to 90 bars, the space velocity is in the range 0.1 $h^{-1}$ to 10 $h^{-}$; preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., and more advantageously more than 320° C. or, for example, between 320-420° C.

Hydroisomerization and hydrocracking step d) is advantageously carried out under conditions such that the conversion per pass of products with a boiling point of 150° C. or more into products having boiling points of less than 150° C. is as low as possible, preferably less than 50%, more preferably less than 30%, and can produce middle distillates (gas oil and kerosene) having cold properties (pour point and freezing point) sufficiently good to satisfy current specifications for this type of fuel.

In this step d), hydroisomerization rather than hydrocracking is intended to be favoured.

Step e)

At least a portion of said heavy fraction is introduced via line 12 into a zone 15 where it is brought into contact with a hydroisomerization/hydrocracking catalyst in the presence of hydrogen 25, using the process of the present invention to produce a middle distillates cut (kerosene+gas oil) having good cold properties.

The catalyst used in zone 15 of step e) to carry out hydrocracking and hydroisomerization reactions of the heavy fraction, defined in accordance with the invention, is of the same type as that present in the reactor 14. However, it should be noted that the catalysts used in reactors 14 and 15 may be identical or different.

During said step e) the fraction entering the reactor is contacted with the catalyst and, in the presence of hydrogen, essentially hydrocracking reactions which, accompanied by n-paraffin hydroisomerization reactions, will improve the quality of the products formed and more particularly the cold properties of the kerosene and gas oil, and also obtain very good distillate yields. The conversion into products having boiling points of 370° C. or more into products with boiling points of less than 370° C. is over 80% by weight, usually at least 85% and preferably 88% or more. In contrast, the conversions of products with boiling points of 260° C. or more into products with boiling points less than 260° C. is at most 90% by weight, generally at most 70% or 80%, preferably at most 60% by weight.

Step f)

The effluents from reactors 14 and 15 are sent via lines 16 and 17 through a distillation train which integrates atmospheric distillation and possibly vacuum distillation, and which is aimed at separating the light products inevitably formed during steps d) and e), for example ($C_1$-$C_4$) gas (line 18) and a gasoline cut (line 19) and at distilling at least one gas oil cut (line 21) and kerosene (line 20). The gas oil and kerosene fractions may be partially recycled (line 23), jointly or separately, to the head of the hydroisomerization/hydrocracking reactor 14 of step d).

A fraction (line 22) is also distilled boiling above gas oil, i.e. the compounds which constitute it have boiling points over those of middle distillates (kerosene+gas oil). This fraction, termed the residual fraction, generally has an initial boiling point of at least 350° C., preferably more than 370° C. This fraction is advantageously recycled to the head of the reactor 15 via the hydroisomerization/hydrocracking line 26 for the heavy fraction (step e).

It may also be advantageous to recycle part of the kerosene and/or gas oil in step d), step e) or both. Preferably, at least one of the kerosene and/or gas oil fractions is recycled in part to step d) (zone 14). It can be shown that it is advantageous to recycle a portion of the kerosene to improve its cold properties.

Advantageously and at the same time, the non hydrocracked fraction is recycled in part to step e) (zone 15).

It goes without saying that the gas oil and kerosene cuts are preferably recovered separately, but the cut points are adjusted by the operator as a function of its needs.

FIG. 1 shows a distillation column 24, but two columns may be used to separately treat the cuts from zones 14 and 15.

In FIG. 1, only a kerosene recycle to the catalyst of reactor 14 is shown. Clearly, a portion of the gas oil may be recycled (separately or with kerosene), preferably over the same catalyst as kerosene.

A further implementation of the invention comprises the following steps:

a) separating at least one light fraction from the feed to obtain a single fraction, termed the heavy fraction, with an initial boiling point in the range 120-200° C.;

b) optional hydrotreatment of said heavy fraction, optionally followed by a step c) for removing at least a portion of the water;

d) passing at least a portion of said fraction which may have been hydrotreated through a process of the invention, wherein conversion over the hydroisomerization/hydrocracking catalyst of products with a boiling point of 370° C. or more into products with boiling points of less than 370° C. is over 80% by weight;

e) distilling the hydrocracked/hydroisomerized fraction to obtain middle distillates, and recycling the residual fraction boiling above said middle distillates to step d).

Figure 2:
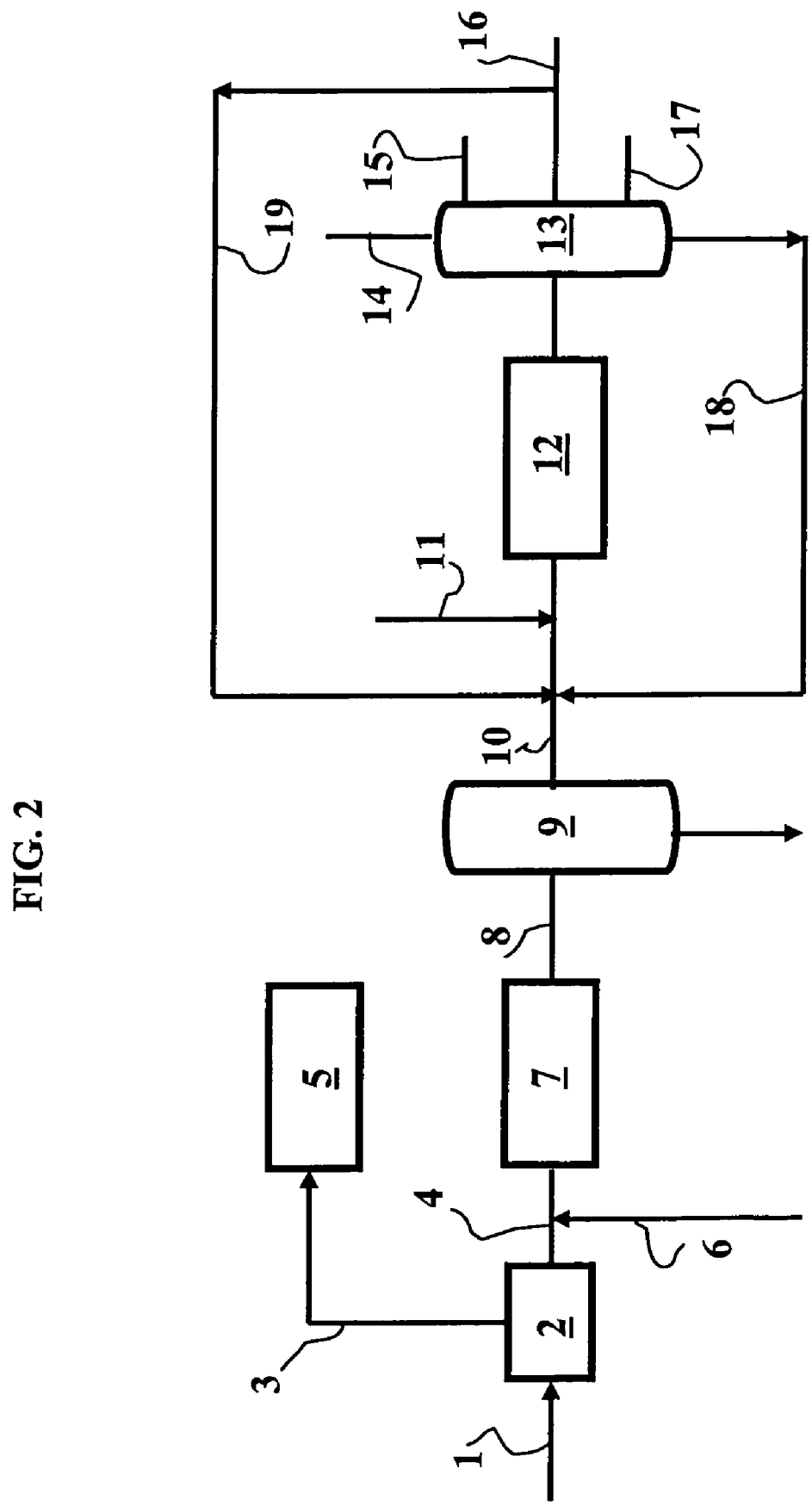

The description of this implementation will be made with reference to FIG. 2, although FIG. 2 does not limit the interpretation.

Step a)

The effluent from the Fischer-Tropsch synthesis unit arriving via line 1 is fractionated (for example by distillation) in a separation means 2 into at least two fractions: at least one light fraction and a heavy fraction with an initial boiling point equal to a temperature in the range 120° C. to 200° C., preferably in the range 130° C. to 180° C. and still more preferably at a temperature of about 150° C.; in other words, the cut point is located between 120° C. to 200° C. The light fraction of FIG. 1 leaves via line 3 and the heavy fraction leaves via line 4.

This fractionation may be carried out using methods which are well known to the skilled person such as flash, distillation, etc.

The light fraction is not treated using the process of the invention but may, for example, constitute a good feed for petrochemistry and more particularly for a steam cracking unit 5. The heavy fraction described above is treated using the process of the invention.

Step b)

Optionally, this fraction is admitted in the presence of hydrogen (line 6) into a zone 7 containing a hydrotreatment catalyst which is intended to reduce the amount of unsaturated olefinic compounds and to hydrotreat the oxygen-containing compounds (alcohols) present in the heavy fraction described above.

The catalysts used in this step b) are non-cracking hydrotreatment catalysts or low cracking catalysts comprising at least one metal from group VIII and/or group VI of the periodic table.

Advantageously, at least one element selected from P, B, Si is deposited on the support.

These catalysts may be prepared using any method known to the skilled person, or may be acquired from firms specialized in the fabrication and sale of catalysts.

In the hydrotreatment reactor 7, the feed is brought into contact in the presence of hydrogen and catalyst at operating temperatures and pressures that can carry out hydrodeoxygenation (HDO) of alcohols and hydrogenation of olefins present in the feed. The reaction temperatures used in the hydrotreatment reactor are in the range 100° C. to 350° C., preferably in the range 150° C. to 300° C., more preferably in the range 150° C. to 275° C. and still more preferably in the range 175° C. to 250° C. The total pressure range used varies from 5 to 150 bars, preferably 10 to 100 bars and more preferably between 10 and 90 bars. The hydrogen which supplies the hydrotreatment reactor is introduced at a rate such that the hydrogen/hydrocarbon volume ratio is in the range 100 to 3000 Nl/l/h, preferably in the range 100 to 2000 Nl/l/h and more preferably in the range 250 to 1500 Nl/l/h. The flow rate of the feed is such that the hourly space velocity is in the range 0.1 to 10 $h^{-1}$, preferably in the range 0.2 to 5 $h^{-1}$, and more preferably in the range 0.2 to 3 $h^{-1}$. Under these conditions, the amount of unsaturated molecules and oxygen-containing molecules is reduced to less than 0.5% and in general to less than 0.1%. The hydrotreatment step is carried out under conditions such that the conversion into products having boiling points of 370° C. or more into products having boiling points of less than 370° C. is limited to 30% by weight, preferably to less than 20% and still more preferably to less than 10%.

Step c)

The effluent (line 8) from hydrotreatment reactor 7 is optionally introduced into a zone 9 for removing water, which is aimed at eliminating at least a portion of the water produced during the hydrotreatment reactions. The water may be eliminated with or without eliminating the $C_4$ minus fraction which is generally produced during the hydrotreatment step. The term "elimination of water" means eliminating the water produced by the hydrodeoxygenation reactions (HDO) of alcohols, but it may also include eliminating at least a portion of the hydrocarbon saturation water. The water may be eliminated using any method and technique known to the skilled person, for example by drying, passage over a desiccant, flash, decanting, etc.

Step d)

The dried heavy fraction (optionally hydrotreated) is then introduced (line 10) as well as an optional stream of hydrogen (line 11) into zone 12 containing the hydroisomerization/hydrocracking catalyst. A further possibility of the process of the invention consists of sending all of the effluent from the hydrotreatment reactor (without drying) to the reactor containing the hydroisomerization/hydrocracking catalyst, preferably at the same time as a stream of hydrogen.

Before use in the reaction, the metal contained in the catalyst must be reduced. A preferred method for reducing the metal is the treatment in hydrogen at a temperature in the range 150° C. to 650° C. and a total pressure in the range 0.1 to 25 MPa. As an example, a reduction consists of a constant temperature stage at 150° C. of 2 hours, then raising the temperature to 450° C. at a rate of 1° C./min, then a constant temperature stage of 2 hours at 450° C.; during the whole of this reduction step, the hydrogen flow rate is 1000 liters of hydrogen/liter of catalyst. It should also be noted that any ex situ reduction is suitable.

The operating conditions in which said step d) is carried out are as follows:

The pressure is maintained at between 2 and 150 bars, preferably between 5 and 100 bars and advantageously 10 to 90 bars; the space velocity is in the range $0.1\ h^{-1}$ to $10\ h^{-1}$, preferably in the range 0.2 to $7\ h^{-1}$ and advantageously between 0.5 and $5.0\ h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., and more advantageously more than 320° C. or, for example, between 320-420° C.

Hydroisomerization and hydrocracking step d) is advantageously carried out under conditions such that the conversion per pass of products with a boiling point of 370° C. or more into products having boiling points of less than 370° C. is more than 80% by weight, more preferably at least 85%, preferably more than 88%, to produce middle distillates (gas oil and kerosene) having cold properties (pour point and freezing) sufficiently good to satisfy current specifications for this type of fuel.

The two steps, hydrotreatment and hydroisomerization/hydrocracking, may be carried out on the two types of catalyst in two or more different reactors and/or in the same reactor.

Step e)

The effluent (hydrocracked/hydroisomerized fraction) at the outlet from the reactor 12, step d), is sent to a distillation train 13 which integrates atmospheric distillation and possibly vacuum distillation, and which is aimed at separating conversion products with a boiling point of less than 340° C. and preferably less than 370° C. and including those formed during step d) in the reactor 12, and to separate the residual fraction the initial boiling point of which is generally more than at least 340° C. and preferably more than at least 370° C. Of the converted and hydroisomerized products, in addition to the light gas $C_1$-$C_4$ (line 14), at least one gasoline fraction (line 15) is separated, and at least one kerosene middle distillate fraction (line 16) and gas oil fraction (line 17). The residual fraction with an initial boiling point generally of more than at least 340° C. and preferably at least 370° C. or more is recycled (line 18) to the head of the hydroisomerization and hydrocracking reactor 12.

It may also be advantageous to recycle (line 19) a portion of the kerosene and/or gas oil obtained to step d) (reactor 12).

A further implementation of the invention comprises the following steps:

a) fractionating (step a)) the feed into at least 3 fractions:
    at least one intermediate fraction having an initial boiling point T1 in the range 120° C. to 200° C. and an end point T2 of more than 300° C. and less than 410° C.;
    at least one light fraction boiling below the intermediate fraction;
    at least one heavy fraction boiling above the intermediate fraction;

b) hydrotreating (step b)) at least a portion of said intermediate fraction then passage (step d)) through a process for treating at least a portion of the hydrotreated fraction over a hydrocracking/hydroisomerization catalyst;

f) passage (step f)) through a process for treating at least a portion of said heavy fraction over a hydrocracking/hydroisomerization catalyst with a conversion of 370° C.+ products into 370° C.− products of more than 80% by weight;

e) and g) distilling (steps e) and g)) at least a portion of the hydrocracked/hydroisomerized fractions to obtain middle distillates;

and at least one of said treatment processes of steps d) and f) is the process of the invention.

Figure 3:
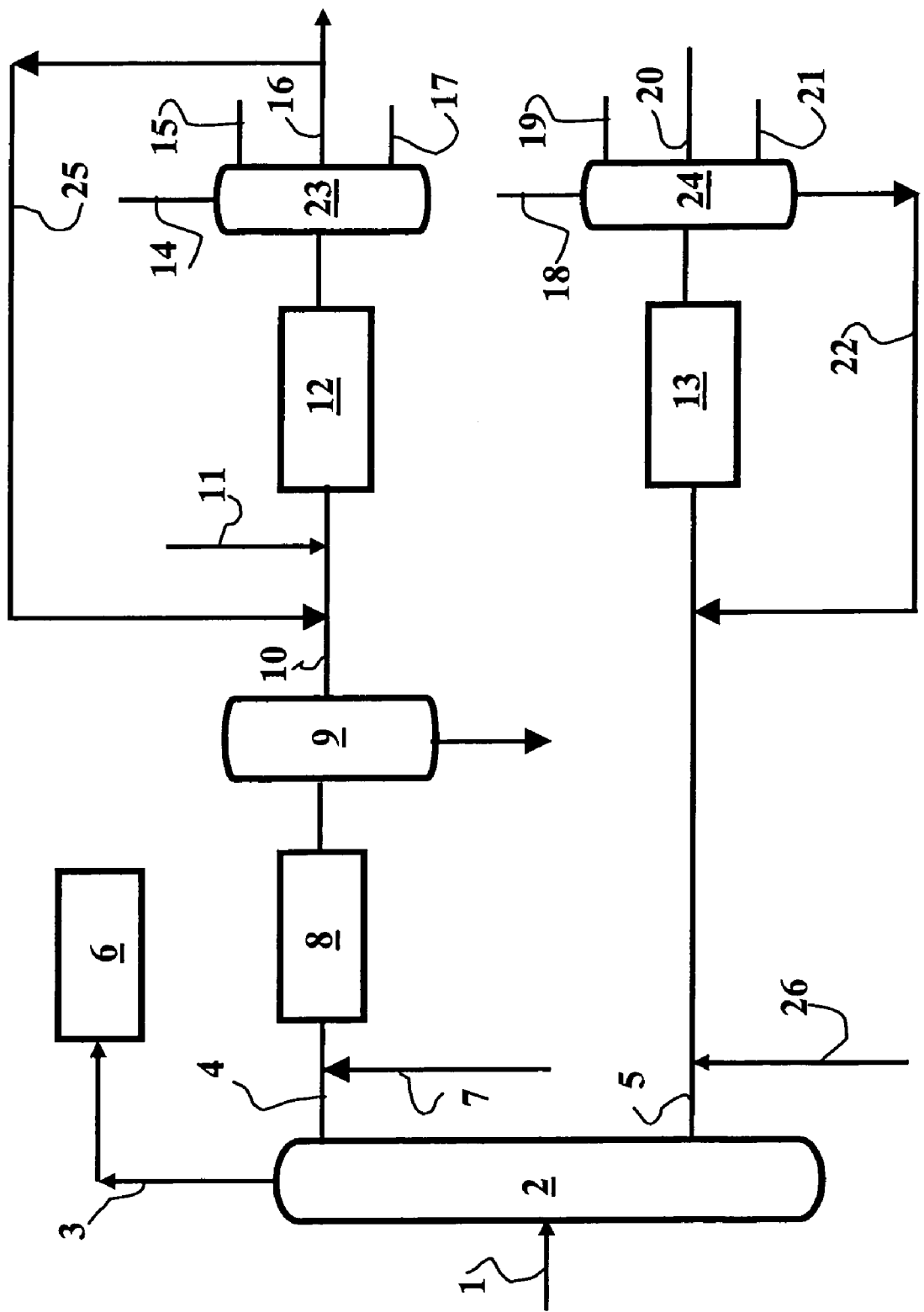

The description of this implementation is made with reference to FIG. 3 which is a non-limiting interpretation.

Step a)

The effluent from the Fischer-Tropsch synthesis arriving via line 1 is fractionated in a fractionation zone 2 into at least three fractions:

at least one light fraction (leaving via the line 3) the constituent compounds of which have boiling points below a temperature T1 in the range 120° C. to 200° C., preferably in the range 130° C. to 180° C. and more preferably at a temperature of about 150° C. In other words, the cut point is between 120° C. and 200° C.;

at least one intermediate fraction (line 4) comprising compounds with boiling points in the range between the cut point T1, as defined above, to a temperature T2 of more than 300° C., more preferably more than 350° C. and less than 410° C. or preferably less than 370° C.;

at least one heavy fraction (line 5) comprising compounds having boiling points of more than the cut point T2 as defined above.

A cut between a boiling point T1 in the range 120° C. and 200° C. and T2 of more than 300° C. and less than 370° C. is preferred. The 370° C. cut is more preferable, i.e. the heavy fraction is a 370° C.+ cut.

Cutting at 370° C. can separate at least 90% by weight of the oxygen-containing compounds and olefins, usually at least 95% by weight. The heavy cut to be treated is then purified and elimination of heteroatoms or unsaturations by hydrotreatment is then not necessary.

Fractionation is carried out here by distillation, but it may be carried out in one or more steps using means other than distillation.

Said fractionation may be carried out using methods which are well known to the skilled person, such as flash, distillation, etc.

The light fraction is not treated using the process of the invention but may, for example, constitute a good feed for a petrochemical unit and more particularly for a steam cracker (steam cracking unit 6).

The heavier fractions described above are treated using the process of the invention.

Step b)

Said intermediate fraction is admitted via line 4, in the presence of hydrogen supplied via pipe 7, into a hydrotreatment zone 8 containing a hydrotreatment catalyst. The aim of said hydrotreatment is to reduce the amount of unsaturated olefinic compounds and to hydrotreat the oxygen-containing compounds (alcohols) present.

The catalysts used in this step b) are non-cracking or slightly cracking hydrotreatment catalysts comprising at least one metal from group VIII and/or group VI of the periodic table.

Advantageously, at least one element selected from P, B and Si is deposited on the support.

Said catalysts may be prepared using any method which is known to the skilled person or may be acquired from firms specialized in the fabrication and sale of catalysts.

In the hydrotreatment reactor 8, the feed is brought into contact in the presence of hydrogen and catalyst at temperatures and operating pressures that can carry out hydrodeoxygenation (HDO) of alcohols and hydrogenation of olefins present in the feed. The reaction temperatures used in the hydrotreatment reactor are in the range 100° C. to 350° C., preferably in the range 150° C. to 300° C., more preferably in the range 150° C. to 275° C. and still more preferably in the range 175° C. to 250° C. The total pressure range used varies from 5 to 150 bars, preferably 10 to 100 bars and more preferably between 10 and 90 bars. The hydrogen which supplies the hydrotreatment reactor is introduced at a rate such that the hydrogen/hydrocarbon volume ratio is in the range 100 to 3000 Nl/l/h, preferably in the range 100 to 2000 Nl/l/h and more preferably in the range 250 to 1500 Nl/l/h. The flow rate of the feed is such that the hourly space velocity is in the range 0.1 to 10 $h^{-1}$, preferably in the range 0.2 to 5 $h^{-1}$, and more preferably in the range 0.2 to 3 $h^{-1}$. Under these conditions, the amount of unsaturated molecules and oxygen-containing molecules is reduced to less than 0.5% and in general to less than 0.1%. The hydrotreatment step is carried out under conditions such that the conversion into products having boiling points of 370° C. or more into products having boiling points of less than 370° C. is limited to 30% by weight, preferably less than 20% and still more preferably less than 10%.

Step c)

The effluent from the hydrotreatment reactor is optionally introduced into a zone 9 for removing water which is aimed at eliminating at least part of the water produced during the hydrotreatment reactions. This water elimination may be carried out with or without eliminating the $C_4$— gas fraction which is generally produced during the hydrotreatment step. The term "elimination of water" means eliminating the water produced by the hydrodeoxygenation reactions (HDO) of alcohols, but it may also include eliminating at least a portion of the hydrocarbon saturation water. Water may be eliminated using any method and technique known to the skilled person, for example by drying, passage over a desiccant, flash, decanting, etc.

Step d)

The optionally dried fraction is then introduced (line 10), along with an optional stream of hydrogen (line 11), into zone 12 containing the hydroisomerization/hydrocracking catalyst. A further possibility of the process of the invention consists of sending all of the effluent leaving the hydrotreatment reactor (without drying) to the reactor containing the hydrocracking/hydrocracking catalyst, preferably at the same time as a stream of hydrogen.

The operating conditions in which said step d) is carried out are as follows:

The pressure is maintained at between 2 and 150 bars, preferably between 5 and 100 bars and advantageously 10 to 90 bars, the space velocity is in the range 0.1 $h^{-1}$ to 10 $h^{-1}$, preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., and more advantageously more than 320° C. or, for example, between 320-420° C.

The two steps, hydrotreatment and hydroisomerization-hydrocracking, may be carried out on the two types of catalysts in two or more different reactors, and/or in the same reactor.

Hydroisomerization and hydrocracking step d) is advantageously carried out under conditions such that the conversion per pass of products with a boiling point of 150° C. or more into products having boiling points of less than 150° C. is as low as possible, preferably less than 50%, more preferably less than 30%, and can produce middle distillates (gas oil and kerosene) having cold properties (pour point and freezing point) which are sufficiently good to satisfy current specifications for this type of fuel.

In this step d), hydroisomerization rather than hydrocracking is intended to be favoured.

Step f)

Said heavy fraction with boiling points which are higher than the cut point T2 as defined above is introduced via line 5 into the zone 13 where, in the presence of hydrogen 26, it is brought into contact with a non-zeolitic hydroisomerization/hydrocracking catalyst to produce a middle distillate cut (kerosene+gas oil) having good cold properties.

The catalyst used in zone 13 of step f) to carry out the hydrocracking and hydroisomerization reactions of the heavy fraction as defined in the invention is of the same type as that present in the reactor 12. However, it should be noted that the catalysts used in reactors 12 and 13 may be identical or different.

During said step f), the fraction entering the reactor undergoes, when in contact with the catalyst and in the presence of hydrogen, essentially hydrocracking reactions which, accompanied by n-paraffin hydroisomerization reactions, will improve the quality of the products formed and more particularly the cold properties of the kerosene and gas oil, and can also produce very good distillate yields. The conversion of products having boiling points of 370° C. or more into products with a boiling point of less than 370° C. is more than 80% by weight, usually at least 85% and preferably 88% or more. In contrast, the conversions of products with boiling points of 260° C. or more into products with a boiling point of less than 260° C. is at most 90% by weight, generally at most 70% or 80%, and preferably at most 60% by weight.

In this step f), then, hydrocracking is encouraged, but preferably by limiting gas oil cracking.

Step g)

The effluent from reactor 12 in step d) is sent to a distillation train which integrates atmospheric distillation and possibly vacuum distillation, and which is aimed at separating the light products inevitably formed during step d), for example ($C_1$-$C_4$) (line 14) and a gasoline cut (line 19) and to distill at least one gas oil cut (line 17) and kerosene (line 16). The gas oil and kerosene fractions may be partially recycled (line 25), jointly or separately, to the head of the hydroisomerization/hydrocracking reactor 12 of step d).

The effluent from step f) undergoes a separation step in a distillation train to separate the light products inevitably formed during step f), for example ($C_1$-$C_4$) gas (line 18) and a gasoline cut (line 19) and to distill a gas oil cut (line 21) and kerosene cut (line 20) and to distill the fraction (line 22)

boiling above gas oil, i.e. with compounds which have boiling points higher than those of middle distillates (kerosene+gas oil). This fraction, the residual fraction, generally has an initial boiling point of at least 350° C., preferably more than 370° C. This non hydrocracked fraction is advantageously recycled to the head of the hydroisomerization/hydrocracking reactor of step f) (line 13).

It may be advantageous to recycle part of the kerosene and/or gas oil to step d), step f) or both. Preferably, at least one of the kerosene and/or gas oil fractions is at least partially recycled line 25) to step d) (zone 12). It can be shown that it is advantageous to recycle part of the kerosene to improve the cold properties.

Advantageously and at the same time, part of the non hydrocracked fraction is recycled to step f) (zone 13).

Clearly, the gas oil and kerosene cuts are preferably recovered separately, but the cut points are adjusted by the operator as a function of its needs.

FIG. 3 shows two distillation columns 23 and 24, but a single column may be used to treat all of the cuts from zones 12 and 13.

FIG. 3 shows only a recycle of kerosene to the catalyst of reactor 12. Clearly, part of the gas oil could be recycled (separately or with the kerosene) and preferably, over the same catalyst as the kerosene. It is also possible to recycle part of the kerosene and/or gas oil produced in lines 20, 21.

A further implementation of the invention comprises the following steps:

a) optional fractionation of the feed into at least one heavy fraction with an initial boiling point in the range 120° C. to 200° C., and at least one light fraction boiling below said heavy fraction;

b) optional hydrotreatment of at least part of the feed or heavy fraction, optionally followed by a step c);

c) eliminating at least a portion of the water;

d) passing at least part of the effluent or of the optionally hydrotreated fraction through a treatment process over a first hydroisomerization/hydrocracking catalyst containing at least one noble group VIII metal;

e) distilling the hydroisomerized/hydrocracked effluent to obtain middle distillates (kerosene, gas oil) and a residual fraction boiling above the middle distillates;

f) on a second hydroisomerization/hydrocracking catalyst containing at least one noble group VIII metal, passing through a treatment process at least a portion of said residual heavy fraction and/or a portion of said middle distillates, and distilling the resulting effluent to obtain middle distillates;

and at least one of said treatment processes of step d) and f) is that of the invention.

Figure 4:
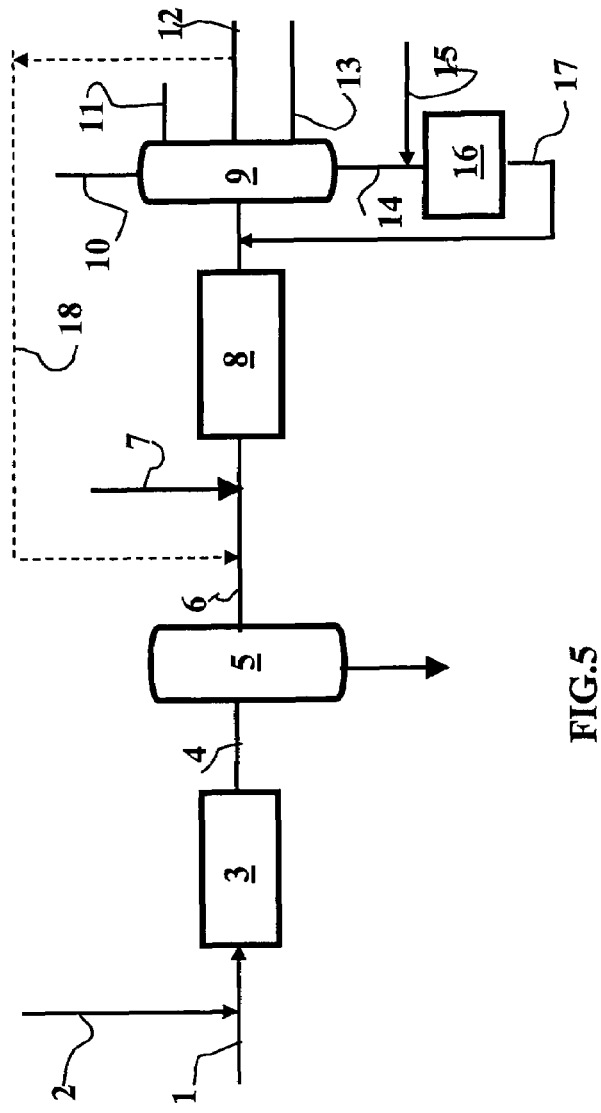
Figure 5:
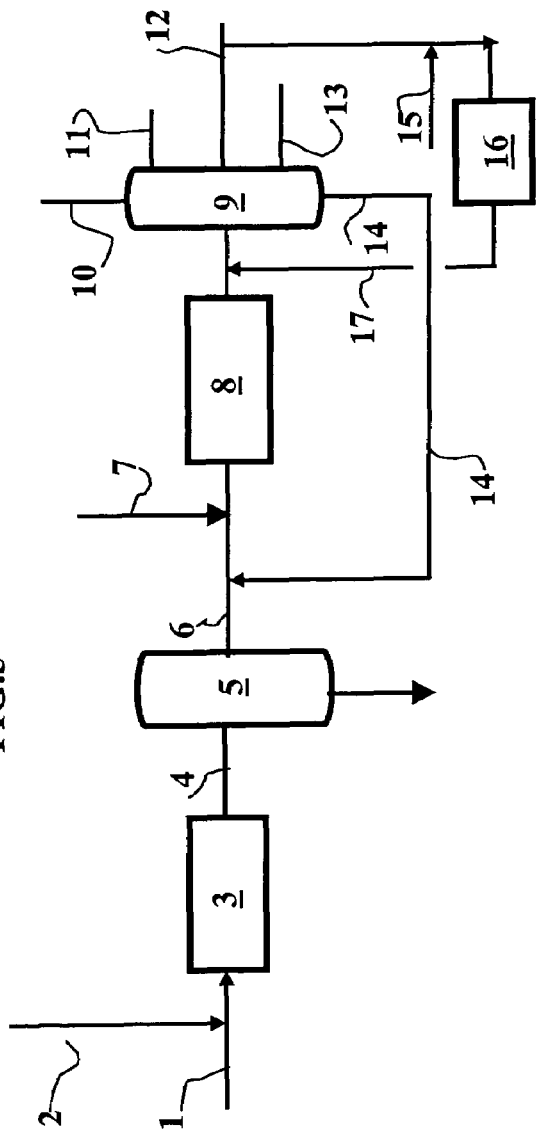

The description of this implementation mode is made by referring to FIGS. 4 and 5 which are non-limiting interpretations.

Step a)

When this step is carried out, the effluent from the Fischer-Tropsch synthesis unit is fractionated (for example by distillation) into at least two fractions: at least one light fraction and at least one heavy fraction with an initial boiling point at a temperature in the range 120° C. to 200° C., preferably in the range 130° C. to 180° C., and more preferably at a temperature of about 150° C.; in other words, the cut point is located between 120° C. and 200° C.

The heavy fraction generally has a paraffins content of at least 50% by weight.

This fractionation may be carried out using any method which is known to the skilled person, such as flash, distillation, etc. By way of non-limiting example, the effluent from the Fischer-Tropsch synthesis unit undergoes flash, decantation to eliminate water and distillation to obtain at least the 2 fractions described above.

The light fraction is not treated using the process of the invention but may, for example, constitute a good feed for petrochemistry and more preferably for a steam cracking unit. At least one heavy fraction as described above is treated using the process of the invention.

Step b)

Optionally, this fraction or at least a portion of the initial feed is admitted via line 1, in the presence of hydrogen (supplied via line 2), into a zone 3 containing a hydrotreatment catalyst which is intended to reduce the amount of unsaturated olefinic compounds and to hydrotreat the oxygen-containing compounds (alcohols) present in the heavy fraction described above.

The catalysts used in this step b) are non-cracking or slightly cracking hydrotreatment catalysts comprising at least one metal from group VIII and/or group VI of the periodic table.

Advantageously, at least one element selected from P, B and Si is deposited on the support.

These catalysts may be prepared using any method which is known to the skilled person or may be acquired from firms specializing in the fabrication and sale of catalysts.

In the hydrotreatment reactor 3, the feed is brought into contact in the presence of hydrogen and catalyst at operating temperatures and pressures which can carry out hydrodeoxygenation (HDO) of alcohols and hydrogenation of olefins present in the feed. The reaction temperatures used in the hydrotreatment reactor are in the range 100° C. to 350° C., preferably in the range 150° C. to 300° C., and more preferably in the range 150° C. to 275° C., more preferably still in the range 175° C. to 250° C. The total pressure range used is 5 to 150 bars, preferably 10 to 100 bars and more preferably between 10 and 90 bars. The hydrogen which supplies the hydrotreatment reactor is introduced at a flow rate such that the hydrogen/hydrocarbon volume ratio is in the range 100 to 3000 Nl/l/h, preferably in the range 100 to 2000 Nl/l/h and more preferably in the range 250 to 1500 Nl/l/h. The flow rate of the feed is such that the hourly space velocity is in the range 0.1 to 10 $h^{-1}$, preferably in the range 0.2 to 5 $h^{-1}$ and more preferably in the range 0.2 to 3 $h^{-1}$. Under these conditions, the amount of unsaturated and oxygen-containing molecules is reduced to less than 0.5% and to about less than 0.1% in general. The hydrotreatment step is carried out under conditions such that the conversion of products having boiling points of 370° C. or more into products having boiling points of less than 370° C. is limited to 30% by weight, preferably less than 20% and more preferably less than 10%.

Step c)

The effluent (line 4) from hydrotreatment reactor 3 is optionally introduced into a water removal zone 5 which is aimed at eliminating at least part of the water produced during the hydrotreatment reactions. This water elimination may be carried out with or without eliminating the $C_4$- gas fraction which is generally produced during the hydrotreatment step. The term "elimination of water" means eliminating water produced by hydrodeoxygenation reactions (HDO) of alcohols, but it may also include eliminating at least a portion of the hydrocarbon saturation water. The water may be eliminated using any method and technique known to the skilled person, for example by drying, passage over a desiccant, flash, decanting, etc.

Step d)

At least a portion and preferably all of the hydrocarbon fraction (at least a portion of the feed or at least a portion of the heavy fraction from step a) or at least a portion of the hydrotreated and optionally dried feed) is then introduced (line 6), as well as an optional stream of hydrogen (line 7), into zone 8 containing said first hydroisomerization/hydrocracking catalyst. A further possibility of the process of the invention consists of sending part or all of the effluent from the hydrotreatment reactor (without drying) to the reactor containing the hydroisomerization/hydrocracking catalyst, preferably at the same time as a stream of hydrogen.

Before use in the reaction, the metal contained in the catalyst must be reduced. A preferred method for reducing the metal is treatment in hydrogen at a temperature in the range 150° C. to 650° C. and a total pressure in the range 0.1 to 25 MPa. As an example, a reduction consists of a constant temperature stage at 150° C. of 2 hours then raising the temperature to 450° C. at a rate of 1° C./min, then a constant temperature stage of 2 hours at 450° C.; during the whole of this reduction step, the hydrogen flow rate is 1000 liters of hydrogen/liter of catalyst. It should also be noted that any ex situ reduction is suitable.

The operating conditions in which said step d) is carried out are as follows:

The pressure is maintained at between 2 and 150 bars, preferably between 5 and 100 bars and advantageously 10 to 90 bars; the space velocity is in the range 0.1 $h^{-1}$ to 10 $h^{-1}$, preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., and more advantageously more than 320° C. or, for example, between 320-420° C.

The two steps, hydrotreatment and hydroisomerization/hydrocracking, may be carried out on the two types of catalyst in two or more different reactors and/or in the same reactor.

Step e)

The hydrocracked/hydroisomerized effluent from the outlet from the reactor 8, step d), is sent to a distillation train 9 which integrates atmospheric distillation and possibly vacuum distillation, and which is aimed at separating conversion products with a boiling point of less than 340° C., preferably less than 370° C. and including those formed during step d) in the reactor 8, and to separate the residual fraction the initial boiling point of which is generally more than at least 340° C. and preferably more than at least 370° C. Of the converted and hydroisomerized products, in addition to the light $C_1$-$C_4$ gases (line 10), at least one gasoline fraction (line 11) is separated, and at least one kerosene middle distillate fraction (line 12) and gas oil fraction (line 13) are separated.

Step f)

The process of the invention uses a second zone 16 containing a hydroisomerization/hydrocracking catalyst (termed the second catalyst). An effluent selected from a portion of the kerosene produced (line 12), a portion of the gas oil (line 13) and the residual fraction, preferably the residual fraction with an initial boiling point of generally more than at least 370° C., is passed over this catalyst in the presence of hydrogen (line 15).

The catalyst present in the reactor 16 of step f) of the process of the invention is, in the same manner as for step d), of the non-zeolitic acid type based on at least one noble metal from group VIII; however, it may be identical to or different from that of step d).

During said step, the fraction entering reactor 16 undergoes, in contact with the catalyst and in the presence of hydrogen, hydroisomerization and/or hydrocracking reactions which will improve the quality of the products formed, more particularly the cold properties of kerosene and gas oil, to obtain distillate yields which are improved over the prior art.

The choice of operating conditions allows the quality of the products (middle distillates), in particular the cold properties, to be finely adjusted.

The operating conditions under which said step f) is carried out are as follows:

The pressure is maintained at between 2 and 150 bars, preferably between 5 and 100 bars and advantageously 10 to 90 bars; the space velocity is in the range 0.1 $h^{-1}$ to 10 $h^{-1}$, preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., more advantageously more than 320° C. or, for example, 320-420° C.

The operator will adjust the operating conditions on the first and second hydrocracking/hydroisomerization catalyst to obtain the desired product quality and yield.

Thus, in general, for the first catalyst, the conversion per pass of products with a boiling point of 150° C. or more to products with boiling points less than 150° C. is less than 50% by weight, preferably less than 30% by weight. These conditions can in particular allow the kerosene/gas oil ratio produced to be adjusted, as well as the cold properties of the middle distillates, in particular of kerosene.

Again generally, for the second catalyst, when the residual fraction is treated, the conversion per pass of products with a boiling point of 370° C. or more to products with a boiling point of less than 370° C. is more than 40% by weight, preferably more than 50% by weight, or more preferably more than 60% by weight. It may also be advantageous to produce conversions of at least 80% by weight.

When a portion of the kerosene and/or gas oil is treated on the second catalyst, the conversion per pass of products with a boiling point of 150° C. or more to products with a boiling point of less than 150° C. is less than 50% by weight, preferably less than 30% by weight.

In general, the operating conditions applied in reactors 8 and 16 may be different or identical. Preferably, the operating conditions used in the two hydroisomerization/hydrocracking reactors are different in terms of operating pressure, temperature, contact time (HSV) and $H_2$/feed ratio. This implementation allows the operator to adjust the quality and/or yield of kerosene and gas oil.

The effluent from reactor 16 is then sent via line 17 to a distillation train to separate the conversion products, namely gasoline, kerosene and gas oil.

FIG. 4 shows an implementation with the residual fraction (line 14) passing into the hydroisomerization/hydrocracking zone 16 (step f), the effluent obtained being sent (line 17) to the separation zone 9.

Advantageously, at the same time, the kerosene and/or gas oil may be partially recycled (line 18) to the hydroisomerization/hydrocracking zone (step d) over the first catalyst.

In FIG. 5, a portion of the kerosene and/or gas oil produced passes into the hydroisomerization/hydrocracking zone 16 (step f), the effluent obtained being sent (line 17) to the separation zone 9.

At the same time, the residual fraction (line 14) is recycled to the hydroisomerization/hydrocracking zone 8 (step d)) over the first catalyst.

It has been established that it is advantageous to recycle a portion of the kerosene to a hydrocracking/hydroisomerization catalyst to improve the cold properties.

In FIGS. 4 and 5, we show only a kerosene recycle. Clearly, a portion of the gas oil could be recycled (separately or with the kerosene), preferably over the same catalyst as the kerosene.

The invention may also be used in other implementations to produce middle distillates.

As an example, one implementation includes hydrotreatment of an effluent from the Fischer-Tropsch synthesis as a whole or after separating the $C_4$- fraction (preferably, conversion of products with boiling points of more than 370° C. is less than 20%), optional separation of the $C_4$- fraction of the hydrotreatment effluent and at least a portion of the residual effluent is treated by the process of the invention (conversion is preferably at least 40%).

In a further implementation, the effluent from the Fischer-Tropsch synthesis is separated into a heavy fraction (preferably boiling above 260° C.) and at least one light fraction (preferably boiling below 260° C.), the heavy fraction is treated by the process of the invention, at least one light fraction is hydrotreated then hydrocracked/isomerized, preferably using the process of the invention.

In a further implementation of the invention, the process may be used to produce middle distillates, essentially in the absence of oxygen-containing organic compounds, from a synthetic mixture of partially oxygen-containing hydrocarbons from the Fischer-Tropsch synthesis process, substantially straight-chain, containing at least 20% by weight of a fraction having a distillation temperature of more than 370° C. The process then comprises the following steps:

a) separating said mixture into at least one fraction with a low boiling point B (generally with a maximum boiling point of 150° C. to 380° C., preferably 260° C. to 370° C.) which is richer in oxygen-containing compounds, and at least one fraction with a high boiling point A which is less rich in oxygen-containing compounds (generally with a boiling point of more than 370° C., optionally comprising at least a portion of a gas oil type cut);

b) subjecting said fraction B to a hydrogenating treatment under conditions which avoid any substantial variation in its mean molecular weight, to obtain a hydrogenated substantially non oxygen-containing mixture of hydrocarbons;

c) recombination of at least a portion of said hydrogenated mixture of step b) with said fraction A to form a mixture C of straight-chain hydrocarbons with a reduced oxygen-containing hydrocarbons content and subjecting said mixture C to a hydrocracking treatment of the invention in the presence of a hydroisomerization/hydrocracking catalyst, to convert at least 40% of said fraction with a high boiling point into a hydrocarbon fraction which can be distilled at a temperature of less than 370° C.;

d) separating at least one fraction of the hydrocarbons from the product obtained in step c) which has a distillation temperature in the middle distillates range.

Figure 6:
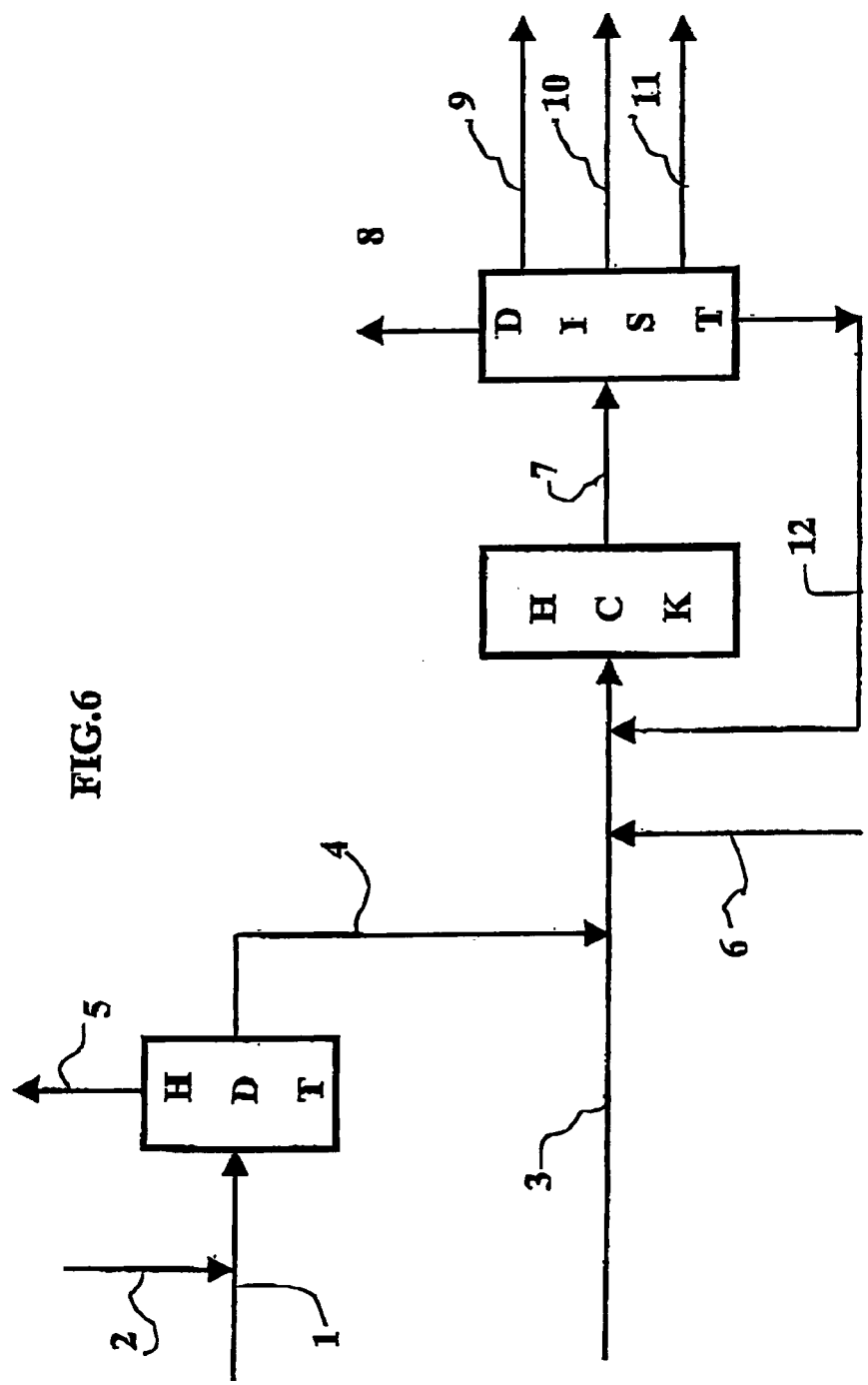

The description of this implementation will be made with reference to FIG. 6, although this FIGURE does not limit the interpretation.

A synthetic stream of substantially straight-chain hydrocarbons, partially oxygen-containing or essentially free of sulphur obtained from a Fischer-Tropsch type process, preferably of the "non shifting" type, is removed from the synthesis reactor previously subdivided into a fraction boiling at a high boiling point A, with an initial boiling point of 200° C. to 450° C., and a fraction with a low boiling point B, with an end point of 200° C. to 450° C. The mass ratio B/A between the two fractions is preferably in the range 0.5 to 2.0, more preferably in the range 0.8 to 1.5 and if necessary, the composition of the two fractions may partially coincide, with a hydrocarbon cut present in the two fractions, preferably with a quantity of 0.1% to 20% by weight with respect to the total weight of each fraction.

The fraction with a low boiling point B is charged via a line 1 into the hydrogenation unit (HDT) to carry out step b) of the present implementation, in which it is brought into contact with hydrogen (line 2) in the presence of a suitable catalyst, under conditions that can minimize or exclude the hydrocracking reaction.

A hydrocarbon fraction produced in the hydrogenation step having an oxygen content of less than 0.001% by weight (with a hydrocarbon fraction gas $C_5$-) is advantageously separated and removed via line 5. This fraction, however, does not represent more than 5%, preferably no more than 3% by weight of the total fraction B.

A fraction with a low boiling point is thus obtained, essentially constituted by a mixture of saturated hydrocarbons, preferably partially isomerized, which is at least in part, preferably completely added via line 4 to fraction A (line 3) of hydrocarbons with a high boiling point with a low oxygen content to form a feed C which supplies a hydrocracking unit (HCK) in step c) of the present implementation of the invention.

The following streams are introduced into the hydrocracking unit (HCK):

the feed C, obtained by adding the fraction A and the fraction resulting from hydrogenation pretreatment of the fraction B, via line 4;

the high boiling point fraction recycled via line 12, preferably having a boiling point of more than 360° C., forming the residue from the middle distillates separation, in a mass ratio which is preferably in the range 1% to 40%, more preferably 5% to 15% with respect to said feed C;

a sufficient quantity of hydrogen via line 6.

The product from the hydrocracking step, composed of a mixture of hydrocarbons with a degree of isomerization (non linear hydrocarbons/mass of mixture) which is preferably over 50%, more preferably over 70%, is introduced via line 7 to a distillation separation step (DIST), preferably a column operating at atmospheric pressure or slightly above, from which the envisaged distillates are withdrawn via lines 10 (kerosene) and 11 (gas oil). In FIG. 6, the following products are also obtained in a distillation unit: a $C_1$-$C_5$ gas fraction, relatively insignificant, via line 8, and a light hydrocarbon fraction, via line 9, preferably with a boiling point of less than 150° C. (naphtha) which is formed in step c).

The Products Obtained

The gas oil(s) obtained has(have) a boiling point of at most 0° C., generally less than −10° C. and often less than −15° C. The cetane index is over 60, generally over 65, usually over 70.

The kerosene(s) obtained has(have) a freezing point of at most −35° C., generally less than −40° C. The smoke point is over 25 mm, generally over 30 mm. In this process, the production of gasoline (not wanted) is as low as possible. The gasoline yield remains less than 50% by weight, preferably less than 40% by weight, advantageously less than 30% by weight or even less than 20% by weight or even less than 15% by weight.

EXAMPLE 1

Characteristics of the Alumina-Silica Support (SA1)

Support SA1 was an alumina-silica which had a chemical composition of 60% by weight of $Al_2O_3$ and 40% by weight of $SiO_2$. Its Si/Al ratio was 0.6. Its sodium content was of the order of 100-120 ppm by weight. The extrudates were cylindrical with a diameter of 1.6 mm. Its specific surface area was 320 m²/g. Its total pore volume, measured by mercury porosimetry, was 0.83 cm³/g. The pore distribution was bimodal. In the mesopore region, a broad peak between 4 and 15 nm was observed with a maximum at 7 nm. Regarding the support, macropores with a diameter of more than 50 nm represented about 40% of the total pore volume.

EXAMPLE 2

Preparation of Hydrocracking Catalysts for Use in the Process of the Invention (C1, in Accordance with the Invention C2 and C3, not in Accordance)

Catalyst C1 was obtained by dry impregnation of support SA-1 (in the form of extrudates) as prepared in Example 1 by an aqueous solution of phosphoric acid $H_3PO_4$ and by a solution of hexachloroplatinic acid $H_2PtCl_6$ dissolved in a volume of solution corresponding to the total pore volume to be impregnated. The impregnated extrudates were then calcined at 550° C. in air for 4 hours. The platinum content was 0.48% by weight and its dispersion, measured by $H_2$—$O_2$ titration, was 82%; its distribution was uniform in the extrudates. The $P_2O_5$ content was 1%.

Catalyst C2 was obtained by dry impregnation of support SA-1 (in the form of extrudates) as prepared in Example 1 by a solution of hexachloroplatinic acid $H_2PtCl_6$ dissolved in a volume of solution corresponding to the total pore volume to be impregnated. The impregnated extrudates were then calcined at 550° C. in air for 4 hours. The platinum content was 0.48% by weight and its dispersion, measured by $H_2$—$O_2$ titration, was 82%; its distribution was uniform in the extrudates. Catalyst C2 contained no doping element.

Catalyst C3 was obtained by dry impregnation of support SA-1 (in the form of extrudates) as prepared in Example 1 by an aqueous solution of phosphoric acid $H_3PO_4$ then by a solution of platinum tetramine dichloride $Pt(NH_3)_4Cl_2$ dissolved in a volume of solution corresponding to the total pore volume to be impregnated. The impregnated extrudates were then calcined at 550° C. in air for 4 hours. The platinum content was 0.57% by weight and its dispersion, measured by $H_2$—$O_2$ titration, was 62%; its distribution was uniform in the extrudates. The $P_2O_5$ content of catalyst C3 was 7%.

EXAMPLE 3

Evaluation of Catalysts C1, C2, C3, in Hydrocracking a Paraffinic Feed from the Fischer-Tropsch Process The catalysts prepared as described in Example 2 were used to hydrocrack a paraffinic feed from a Fischer-Tropsch unit the principal characteristics of which are given below:

| | |
|---|---|
| Density at 20° C. | 0.79 |
| Simulated distillation, SD | |
| SD: initial point | 170 |
| SD: 10% w ° C. | 197 |
| SD: 50% w ° C. | 310 |
| SD: 90% w ° C. | 495 |
| SD: end point, ° C. | 590 |
| Percentage of 370° C. + fraction (wt %) | 33 |

Catalysts C1, C2 and C3 were used in accordance with the process of the invention in a pilot unit comprising one fixed traversed bed reactor, the fluids circulating from bottom to top (up-flow mode).

Prior to the hydrocracking test, the catalysts were reduced at 50 bars, at 450° C. in pure hydrogen.

After reduction, the catalytic test was carried out under the following conditions:

| | | |
|---|---|---|
| Total pressure | 50 MPa | T = 320° C. |

Ratio of $H_2$ to feed, 800 normal liters/liter of feed.

The hourly space velocity (HSV) was 1 h⁻¹.

The catalytic performance was measured by assaying n-paraffins. The catalytic performance is expressed by the net conversion C22+.

The net conversion C22+ is taken to be equal to:

$$NC\ C22+=[(\%\ C22+_{\mathit{effluents}})-(\%\ C22+_{\mathit{feed}})]/[100-(\%\ C22+_{\mathit{feed}})]]$$

The yields were expressed as C5-C9, C10-C22 and C22+.

The catalytic performances obtained are given in Tables 1 and 2 below.

TABLE 1

Net conversion s of C22+

| | Net conversion, C22+ |
|---|---|
| C1 | 72% |
| C2 | 68% |
| C3 | 65% |

TABLE 2

Yields of products formed:

| | Yields (wt %) C5-C9 | Yields (wt %) C10-C22 | Yields (wt %) C22+ |
|---|---|---|---|
| C1 | 11.6 | 79 | 9.3 |
| C2 | 11.8 | 77.5 | 10.6 |
| C3 | 12 | 76 | 11.7 |

These results (Tables 1 and 2) show that the use of the catalysts of the invention and in a process of the invention allows a paraffinic feed from the Fischer-Tropsch synthesis process to produce, by hydrocracking, very good yields of middle distillates, 150-250 cuts (kerosene) and 250-370° C. cuts (gas oil).

The invention claimed is:

1. In a process for producing middle distillates, comprising contacting a paraffinic feed under sufficient catalytic hydrocracking and hydroisomerization conditions so as to produce said middle distillates, said paraffinic feed comprising a cut produced directly or indirectly by Fischer-Tropsch synthesis, the catalyst being a hydrocracking/hydroisomerization catalyst comprising:
    at least one hydrodehydrogenating element selected from elements from group VIB and group VIII of the periodic table;
    and a non-zeolitic support comprising alumina-silica;
    said alumina-silica having the following characteristics:
        a percentage of silica in the range of 5% to 95% by weight;
        a sodium content of less than 0.03% by weight;
        a total pore volume, measured by mercury porosimetry, in the range of 0.45 to 1.2 ml/g;
        a porosity such that:
            i) the volume of mesopores with a diameter in the range of 40 to 150 Å and a mean pore diameter in the range 80 to 140 Å represents 30-80% of the total pore volume measured by mercury porosimetry;
            ii) the volume of macropores with a diameter of more than 500 Å represents 20-70% of the total pore volume measured by mercury porosimetry;
        a BET specific surface area in the range of 100 to 550 m$^2$/g;
        an X ray diffraction diagram which contains at least the characteristic principal peaks of at least one transition alumina included in the group composed of alpha, rho, khi, eta, gamma, kappa, theta and delta aluminas,
the improvement wherein said catalyst comprises 0.01% by weight to 6% by weight of $P_2O_5$ as a doping element, and wherein the concentration of $P_2O_5$ as a doping element is sufficient to provide an increased yield of middle distillate compared to the same catalysts having a content of $P_2O_5$ below 0.01% by weight and above 6% by weight.

2. A process according to claim 1, said catalyst also comprising boron and/or silicon as doping elements.

3. A process according to claim 1, in which the volume of mesopores with a diameter in the range 40 to 150 Å and a mean pore diameter in the range 80 to 120 Å represents in the range 40% to 70% of the total pore volume measured by mercury porosimetry.

4. A process according to claim 1, in which the alumina-silica comprises 30% to 50% of $Q^2$ sites, in which one Si atom is bonded to two Si or Al atoms and to two OH groups, and also comprises 10-30% of $Q^3$ sites in which one Si atom is bonded to three Si or Al atoms or to an OH group.

5. A process according to claim 1, in which the catalyst support is constituted by alumina-silica alone.

6. A process according to claim 1, in which the catalyst support comprises 1% to 40% by weight of binder.

7. A process according to claim 1, in which the support consists essentially of a mixture of alumina-silica and at least one binder selected from silica, alumina, clays, titanium oxide, boron oxide and zirconia.

8. A process according to claim 1, in which the hydrocracking/hydroisomerization catalyst contains a noble group VIII metal.

9. A process according to claim 7, in which the hydrocracking/hydroisomerization catalyst contains 0.05% to 10% of noble group VIII metal.

10. A process according to claim 1, in which the hydrocracking/hydroisomerization catalyst comprises platinum and/or palladium.

11. A process according to claim 9, in which the amount of phosphorus in the catalyst is in the range of 0.01% to 4% by weight of oxide.

12. A process according to claim 10, in which the amount of phosphorus in the catalyst is in the range of 0.01% to 2.5% by weight of oxide.

13. A process according to claim 1, wherein the, catalyst exhibits a proportion of octahedral $Al_{VI}$, determined by solid $^{27}Al$ MAS NMR spectral analysis of more than 50%.

14. A process according to claim 1, wherein, the catalyst has a cationic impurities content of less than 0.1% by weight.

15. A process according to claim 1, wherein the catalyst has an anionic impurities content of less than 1% by weight.

16. A process for producing middle distillates from a paraffinic feed produced by Fischer-Tropsch synthesis, according to claim 1, comprising the following successive steps: removing from the paraffinic feed a single fraction, termed the heavy fraction, with an initial boiling point between 120-200° C.;
    a) hydrotreating at least a portion of said heavy fraction;
    b) fractionating resultant hydrotreated fractions into at least 3 fractions: at least one intermediate fraction having an initial boiling point T1 in the range 120 to 200° C., and an end point T2 of more than 300° C. and less than 410° C., at least one light fraction boiling below the intermediate fraction, at least one heavy fraction boiling above the intermediate fraction;
    c) passing at least a portion of said intermediate fraction over said hydroisomerization/hydrocracking catalyst;
    d) passing at least a portion of said heavy fraction over said hydroisomerization/hydrocracking catalyst;
    e) distilling the hydrocracked/hydroisomerized fractions to obtain middle distillates, and recycling the residual fraction boiling above said middle distillates in step e) over said catalyst treating the heavy fraction.

17. A process for producing middle distillates from a paraffinic feed produced by the Fischer-Tropsch synthesis, according to claim 1, comprising the following steps:
    a) separating at least a light fraction from the feed to obtain a single fraction, termed the heavy fraction, with an initial boiling point in the range of 120-200° C.;
    b) optionally, hydrotreating said heavy fraction, optionally followed by a step
    c) for removing at least a portion of the water;
    d) passing at least a portion of said optionally hydrotreated fraction heavy fraction over said hydroisomerization/hydrocracking catalyst so as to convert more than 80% by weight of products with a boiling point of 370° C. or more into products with a boiling point of less than 370° C.; and
    e) distilling the hydrocracked/hydroisomerized fraction to obtain middle distillates, and recycling the residual fraction boiling above said middle distillates to step d).

18. A process for producing middle distillates from a paraffinic feed produced by the Fischer-Tropsch synthesis, according to claim 1, comprising the following steps in succession:
- a) fractionating (step a)) the feed into at least 3 fractions:
  - at least one intermediate fraction having an initial boiling point T1 in the range of 120° C. to 200° C., and an end point T2 of more than 300° C. and less than 410° C.;
  - at least one light fraction boiling below the intermediate fraction;
  - at least one heavy fraction boiling above the intermediate fraction;
- b) hydrotreating (step b)) at least a portion of said intermediate fraction, then passing at least a portion of the hydrotreated fraction over said hydrocracking/hydroisomerization catalyst;
- f) passing (step f)) at least a portion of said heavy fraction over said hydrocracking/hydrocracking catalyst with a conversion of more than 80% by weight of products with a boiling point of 370° C. or more into products with a boiling point of less than 370° C.;
- e) and g) distilling (steps e) and g)) at least a portion of the hydrocracked/hydroisomerized fractions to obtain middle distillates.

19. A process for producing middle distillates from a paraffinic feed produced by the Fischer-Tropsch process, comprising the following successive steps:
- a) optional fractionation of the feed into at least one heavy fraction with an initial boiling point in the range of 120° C. to 200° C. and at least one light fraction boiling below said heavy fraction;
- b) optional hydrotreatment of at least a portion of the feed or the heavy fraction, optionally followed by a step c);
- c) for eliminating at least a portion of the water;
- d) passing at least a portion of the effluent or the optionally hydrotreated fraction over a first hydroisomerization/hydrocracking catalyst containing at least one noble metal from group VIII;
- e) distilling the hydroisomerized/hydrocracked effluent to obtain middle distillates (kerosene, gas oil) and a residual fraction boiling above the middle distillates;
- f) over a second hydroisomerization/hydrocracking catalyst containing at least one noble metal from group VIII, passing at least a portion of said residual heavy fraction and/or a portion of said middle distillates, and distilling the resulting effluent to obtain middle distillates with the provision that at least one of steps (d) and (f) is conducted according to claim 1.

20. A process for producing middle distillates from a paraffinic feed produced by the Fischer-Tropsch process according to claim 1, comprising the following successive steps:
- a) separating the feed into at least one fraction with a low boiling point (B) which is richer in oxygen-containing compounds and at least one fraction with a high boiling point (A) which is less rich in oxygen-containing compounds;
- b) subjecting said fraction (B) to a hydrogenating treatment under conditions of a nature which avoids any substantial variation in its mean molecular weight, to obtain a hydrogenated substantially non oxygen-containing mixture of hydrocarbons;
- c) recombining at least a portion of said hydrogenated mixture of step b) with said fraction (A) to form a mixture (C) of straight-chain hydrocarbons with a reduced oxygen-containing hydrocarbon content and subjecting said mixture (C) to a hydrocracking treatment in the presence of said hydroisomerization/hydrocracking catalyst to convert at least 40% of said fraction with a high boiling point into a hydrocarbon fraction which may be distilled at a temperature of less than 370° C.;
- d) separating at least one hydrocarbon fraction from the product obtained in step c) having the distillation temperature in the middle distillates range.

21. In a process for producing middle distillates, comprising contacting a paraffinic feed under sufficient catalytic hydrocracking and hydroisomerization conditions so as to produce said middle distillates, said paraffinic feed comprising a cut produced directly or indirectly by Fischer-Tropsch synthesis, the catalyst being a hydrocracking/hydroisomerization catalyst comprising:
- at least one hydrodehydrogenating element selected from elements from group VIB and group VIII of the periodic table;
- and a non-zeolitic support comprising alumina-silica;
- said alumina-silica having the following characteristics:
  - a percentage of silica in the range of 5% to 95% by weight;
  - a sodium content of less than 0.03% by weight;
  - a total pore volume, measured by mercury porosimetry, in the range of 0.45 to 1.2 ml/g;
  - a porosity such that:
    - iii) the volume of mesopores with a diameter in the range of 40 to 150 Å and a mean pore diameter in the range 80 to 140 Å represents 30-80% of the total pore volume measured by mercury porosimetry;
    - iv) the volume of macropores with a diameter of more than 500 Å represents 20-70% of the total pore volume measured by mercury porosimetry;
  - a BET specific surface area in the range of 100 to 550 m$^2$/g;
  - an X ray diffraction diagram which contains at least the characteristic principal peaks of at least one transition alumina included in the group
  - composed of alpha, rho, khi, eta, gamma, kappa, theta and delta aluminas, the improvement wherein said catalyst comprises about 1% by weight of $P_2O_5$ as a doping element, and wherein the concentration of $P_2O_5$ as a doping element is sufficient to provide an increased yield of middle distillate compared to the same catalysts having a content of $P_2O_5$ below 0.01% by weight and above 6% by weight.

* * * * *

UNITED STATES PATENT AND TRADEMARK OFFICE
CERTIFICATE OF CORRECTION

PATENT NO. : 7,655,136 B2
APPLICATION NO. : 11/475259
DATED : February 2, 2010
INVENTOR(S) : Euzen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Twenty-eighth Day of December, 2010

David J. Kappos
*Director of the United States Patent and Trademark Office*